United States Patent [19]

Nakazawa et al.

[11] Patent Number: 4,984,161

[45] Date of Patent: Jan. 8, 1991

[54] METHOD FOR CONTROLLING AUTOMATIC TRANSMISSIONS

[75] Inventors: Takeshi Nakazawa; Jun Hashimoto; Shinichi Nakamura; Katsumi Yamazaki, all of Saitama; Yoshihiro Nakajima; Tsutomu Hayashi, both of Tokyo; Tetsuya Ichikawa, Saitama; Nobuyuki Yakigaya, Chiba; Kiyoshi Katahira; Yoshinobu Takeshima, both of Saitama, all of Japan

[73] Assignee: Honda Giken Kogyo Kabushiki Kaisha, Tokyo, Japan

[21] Appl. No.: 171,707

[22] Filed: Mar. 22, 1988

[30] Foreign Application Priority Data

| Mar. 24, 1987 | [JP] | Japan | 62-70090 |
| Mar. 24, 1987 | [JP] | Japan | 62-70091 |
| Mar. 27, 1987 | [JP] | Japan | 62-73577 |
| Apr. 6, 1987 | [JP] | Japan | 62-84237 |
| Apr. 7, 1987 | [JP] | Japan | 62-84991 |
| Sep. 1, 1987 | [JP] | Japan | 62-218757 |
| Oct. 16, 1987 | [JP] | Japan | 62-261126 |
| Dec. 11, 1987 | [JP] | Japan | 62-313872 |

[51] Int. Cl.$^5$ .................. B60K 41/12; B60K 41/18; G06F 15/48
[52] U.S. Cl. .................. 364/424.1; 74/866
[58] Field of Search ............ 364/424.1; 192/0.052, 192/0.076; 74/606 R, 606 A, 687, 688, 689, 866, 867

[56] References Cited

U.S. PATENT DOCUMENTS

| 4,082,013 | 4/1978 | Dornfeld et al. | 74/866 |
| 4,229,998 | 10/1980 | Mizuno et al. | 78/865 |
| 4,236,595 | 12/1980 | Beck et al. | 180/243 |
| 4,253,347 | 3/1981 | Mizuno et al. | 74/862 |
| 4,261,229 | 4/1981 | Mizuno et al. | 74/866 |
| 4,363,247 | 12/1982 | Weseloh | 74/687 |
| 4,387,608 | 6/1983 | Mohl et al. | 74/866 |
| 4,428,257 | 1/1984 | Meyerle et al. | 74/866 |
| 4,507,986 | 4/1985 | Okamura et al. | 74/866 |
| 4,509,125 | 4/1985 | Fattic et al. | 364/424.1 |
| 4,543,077 | 9/1985 | Yamamuro et al. | 474/18 |
| 4,584,907 | 4/1986 | Niwa et al. | 74/866 |
| 4,603,602 | 8/1986 | Tanaka et al. | 74/866 |
| 4,631,977 | 12/1986 | Kawashima | 74/606 A |
| 4,648,496 | 3/1987 | Petzold et al. | 192/0.076 |
| 4,671,134 | 6/1987 | Luo | 74/689 |
| 4,701,853 | 10/1987 | Osanai | 364/424.1 |
| 4,744,032 | 5/1988 | Miyaura et al. | 364/421.1 |
| 4,745,748 | 5/1988 | Hayashi et al. | 60/489 |
| 4,782,934 | 11/1988 | Takano et al. | 192/0.073 |
| 4,811,225 | 3/1989 | Petzold et al. | 364/424.1 |
| 4,829,433 | 5/1989 | Nakano et al. | 364/424.1 |
| 4,875,390 | 10/1989 | Hayashi et al. | 74/731 |

FOREIGN PATENT DOCUMENTS

| 0056865 | 8/1982 | European Pat. Off. . |
| 0198694 | 10/1986 | European Pat. Off. . |
| 0209286 | 1/1987 | European Pat. Off. . |
| 0231059 | 8/1987 | European Pat. Off. . |
| 0240178 | 10/1987 | European Pat. Off. . |
| 0243004 | 10/1987 | European Pat. Off. . |
| 56-46153 | 4/1981 | Japan . |
| 57-90450 | 6/1982 | Japan . |
| 57-161346 | 10/1982 | Japan . |
| 57-200756 | 12/1982 | Japan . |
| 59-110952 | 6/1984 | Japan . |

Primary Examiner—Felix D. Gruber
Attorney, Agent, or Firm—Lyon & Lyon

[57] ABSTRACT

The present invention relates to a method for controlling an automatic transmission of a vehicle which is capable of continuously changing a transmission ratio (Rt) and transmission coefficient (Ct). The method is three fold, that is, an initial stage control procedure, a special stage control procedure and a normal stage control procedure having priority in operation in this order.

At the initial stage control procedure, Rt and Ct are determined, according to a plurality of indices representing a state of the vehicle, so that the vehicle is accelerated effectively, in general.

At the special stage control procedure, Rt and Ct are determined, when a propelling force transmitting path for transmitting propelling force from an engine to the ground is disconnected at least at one part, so that a shock due to a recovery of said propelling force transmitting path is minimized.

At the normal stage control procedure, Rt and Ct are determined so that the vehicle responds to the operation of the driver swiftly.

28 Claims, 29 Drawing Sheets

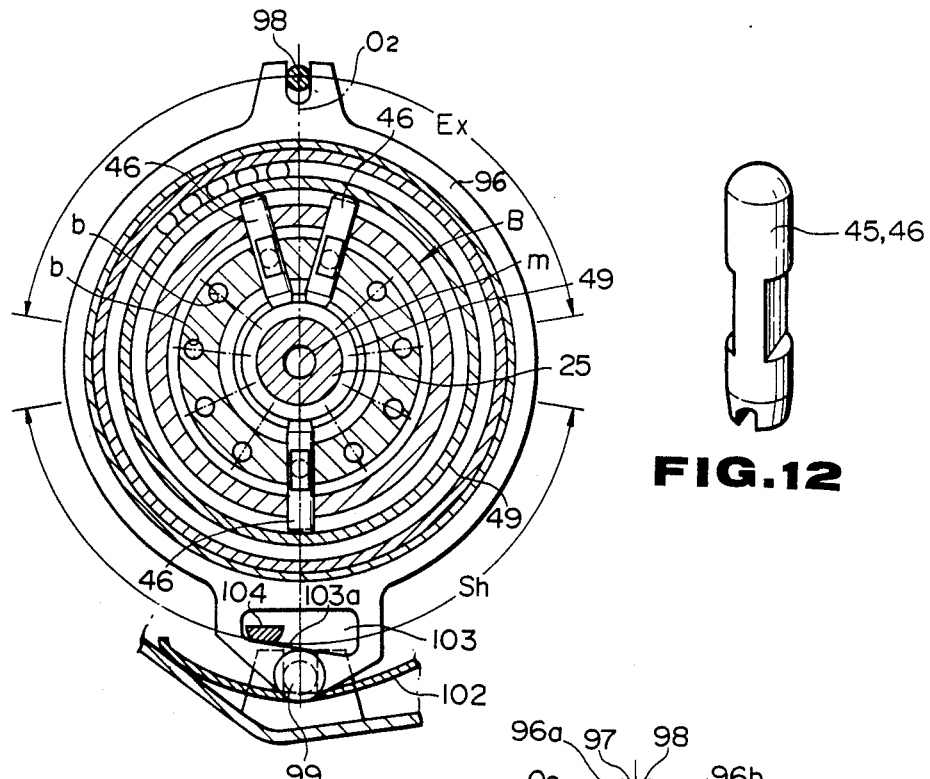
FIG.12
FIG.13(A)
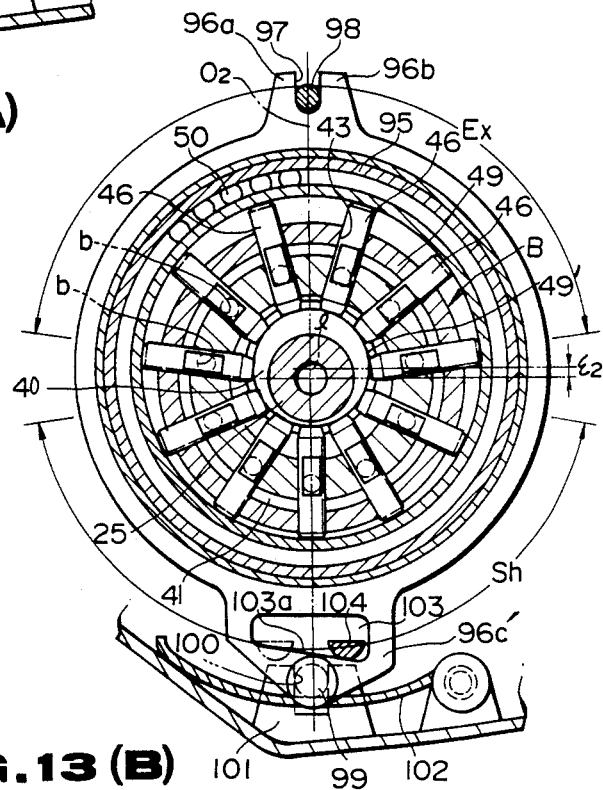
FIG.13(B)

METHOD FOR CONTROLLING AUTOMATIC TRANSMISSIONS

BACKGROUND OF THE INVENTION

The field of the present invention is methods for controlling automatic transmissions of vehicles.

A known method for controlling continuously variable transmissions is described, for example, in Japanese Patent Application Publication No. 57-161346, best explained with reference to FIG. 1 herein. First, all of the sensors and instruments within the transmission control system are initialized, step (s-1). Subsequently, the rotational speed of the engine (Ne), the speed of the vehicle (V), and the transmission ratio (R) are read by a control unit, step (s-2). In making reference to a transmission ratio herein, the transmission ratio is understood to denote a quotient of rotational speed of the input shaft into the transmission divided by the rotational speed of the output shaft from the transmission.

An objective transmission ratio (Rm), which is the desired transmission ratio to which the transmission is to adjust, is calculated as a function of only the rotational speed (Ne) of the engine, step (s-3). Generally, the objective transmission ratio (Rm) is higher than an actual ratio (R) when the rotational speed (Ne) of the engine is lower than a set value; and (Rm) is set lower when (Ne) is high.

The actual transmission ratio (R) is compared with the objective transmission ratio (Rm), step (s-4). If the objective and actual ratios are the same, control proceeds to step (s-5). If not, control proceeds to step (s-6). In step (s-5), the transmission ratio (R) is maintained at its present value and the control returns to step (s-2). If the objective and actual ratios are not the same, a comparison is made as to which is larger in step (s-6). If the objective transmission ratio (Rm) is smaller, control proceeds to step (s-7) where the actual ratio (R) is decreased. If the actual ratio (R) is smaller than the objective ratio (Rm), control proceeds to step (s-8) where the actual ratio (R) is increased. Following either of step (s-7) or step (s-8), control returns to step (s-2).

The following problems reside in the foregoing conventional method of procedure for controlling transmission ratios of an automatic transmission system.

(1) In conventional systems, the transmission is often set at a high ratio when the vehicle starts moving. This makes it difficult to shove start the vehicle.

Shove starting a vehicle is contemplated here to occur when the engine of the vehicle is caused to start using the vehicle inertia. There are some situations where the vehicle is often shove started. For example, a motorcycle is often shove started when used in off-road racing. When a vehicle engine stops unintentionally while the vehicle is moving, restarting may be achieved by the vehicle inertia.

When shove starting a vehicle equipped with a manual transmission by pushing the vehicle, the transmission ratio is most conveniently set to the second or third gear position so as to give sufficient torque and rotational speed to the engine. However, with a conventional automatic transmission, the transmission ratio is set to a high ratio, corresponding to a low gear position when starting. Thus, when pushing the vehicle by hand for a shove start, the reaction force resisting the pushing makes it difficult to gain sufficient speed to start the engine.

(2) According to conventional methods, the rotational speed of the engine is allowed to vary beyond the most powerful speed range. Thus, greatest available power cannot be realized throughout the driving range.

In vehicles equipped with conventional manual transmissions and clutches, the clutch may be slipped with the transmission in low gear to achieve rapid acceleration beginning from a low speed. According to conventional control methods with variable transmissions, on the other hand, if clutch slippage is used and engine speed becomes high, the transmission ratio (R) is reduced, adversely affecting acceleration.

(3) Under conditions when the driving wheel looses traction due to spinning or locking, conventional control methods for continuously variable transmissions adjust to the wheel speed in the spinning or locked condition. Consequently, the ratio is adjusted to an inappropriate level such that engine braking is inappropriately applied or acceleration is compromised when the wheel again grips the driving surface.

Once a driving wheel slips relative to the ground or driving surface because of an excessively high driving force being transmitted to the driving wheel, rotational speed of the engine (Ne) rises inappropriately and the transmission ratio (R) is shifted to a low ratio. Therefore, when the driving wheel again grips the driving surface, the rotational speed (Ne) of the engine is brought down, resulting in power loss. On the other hand, if wheel slippage is caused by excessive braking force such that the driving wheel may lock or approach the locked condition, the engine speed is lowered and the control circuit accommodates that condition by readjusting the ratio to raise the engine speed. Once in this condition, the vehicle is unintentionally slowed down when the driving wheel regrips the surface.

(4) Similarly, while jumping a motorcycle or other vehicle, the rotational speed of the driving wheel becomes mismatched with the actual speed of the vehicle. Again, conventional automatic systems inappropriately adjust to the wheel speed rather than the vehicle speed.

When a vehicle jumps and the driving wheel comes off the ground, the driving wheel looses traction and the rotational speed of the engine momentarily increases. According to conventional control methods for continuously variable transmissions, the transmission ratio is then reduced. The vehicle then returns to the ground and the wheel slows to match the vehicle speed. With the adjusted ratio, the driving wheel does not regrip the ground quickly and acceleration is compromised. Further, the rotational speed of the engine momentarily slows when the wheel regrips the surface resulting in a further compromise to acceleration. In a condition where the throttle is closed while the vehicle is in the jump, the rotational speed of the engine decreases and the transmission ratio becomes higher. Under this circumstance, when the vehicle regrips the driving surface, braking may be experienced In both cases, performance is lost.

(5) Such conventional control systems for continuously variable transmissions also are inconvenient because the transmission is often not coupled with the engine by a clutch controlled by the operator and the transmission ratio also cannot be controlled by the operator. Other driving conditions not mentioned above can also adversely affect performance.

SUMMARY OF THE INVENTION

The present invention is directed to a method for controlling a continuously variable automatic transmission by a plurality of control procedures depending upon speed and/or acceleration of the driving wheel or wheels.

In achieving practical application of the present invention, three stage controls may be employed. The three stages may follow a priority in control among these stage controls as well.

An initial stage control may automatically select and set a transmission ratio and transmission coefficient while the speed of the vehicle is lower than a predetermined level. This first or initial stage control provides for efficient acceleration in certain vehicle speed ranges.

A second or special stage control selects and sets a transmission ratio and transmission coefficient when the vehicle is no longer in the initial stage control and when the driving force of the engine is disconnected from traction with the driving surface Such a special stage control would be applied when the vehicle is in a jump, when the driving wheel is locked by braking or when the driving wheel is spinning due to excessive acceleration. Such a condition would also apply when the engine is disengaged from the transmission by actuation of a clutch. In such cases, the transmission is controlled so that shock is minimized when the driving force transmission path between the engine and traction of the driving wheel is again complete. The special stage control may be achieved by synchronizing the rotational speed of the driving wheel to the actual speed of the vehicle.

Finally, a normal stage control may be applied for automatically selecting and setting the transmission ratio and transmission coefficient while the vehicle is not operating in the conditions demanding the initial stage control or the special stage control. Under the normal stage control, the vehicle would accelerate, maintain constant speed and slow down under normal control of the driver Accordingly, it is a principal object of the present invention to provide an improved method for controlling a continuously variable automatic transmission. Such methods as may be achieved according to the present invention may facilitate starting the vehicle by shoving, contribute to efficient acceleration under various driving conditions, minimize shock upon recovery of traction and avoid shock during clutching. Further objects and advantages of the present invention will appear hereinafter.

BRIEF DESCRIPTION OF THE DRAWINGS

FIG. 12 is a perspective view of a servo-valve.

FIG. 13(A) and (B) are cross-sectional views of a secondary hydraulic distributor and a timing mechanism therefor.

DETAILED DESCRIPTION OF THE PREFERRED EMBODIMENTS OF THE INVENTION

Now, preferred embodiments of the present invention will be explained hereinafter in detail, referring to the attached drawings from FIG. 2 to FIG. 35, for mere examples.

4.1 Construction of the automatic Transmission

Figure 1:
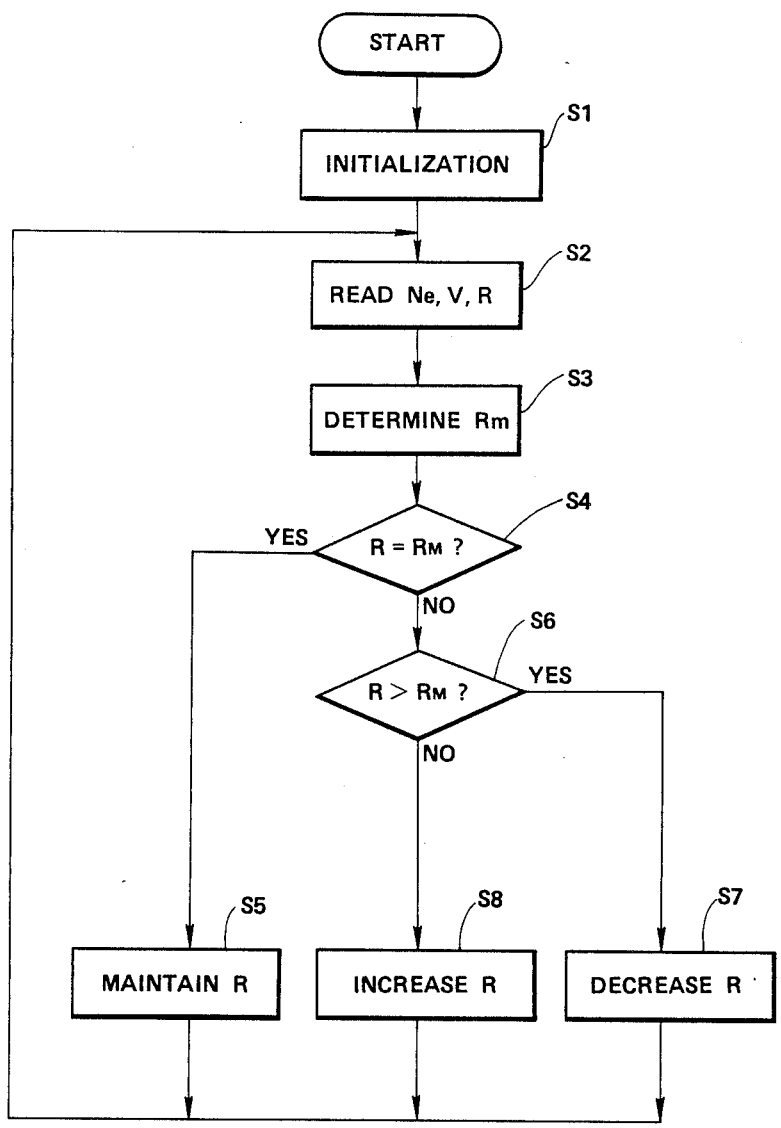
FIG. 1 is a flow chart of a conventional control procedure for an automatic transmission.
Figure 2:
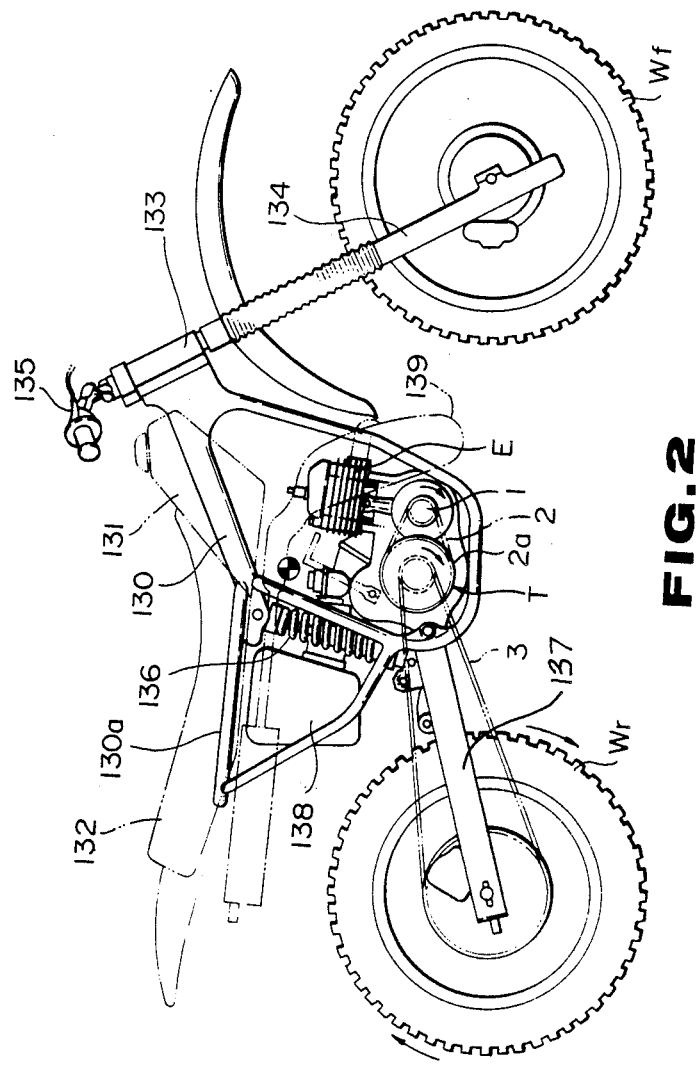
FIG. 2 is a partially cut away side view of a motorcycle equipped with a continuously variable automatic transmission.
Figure 3:
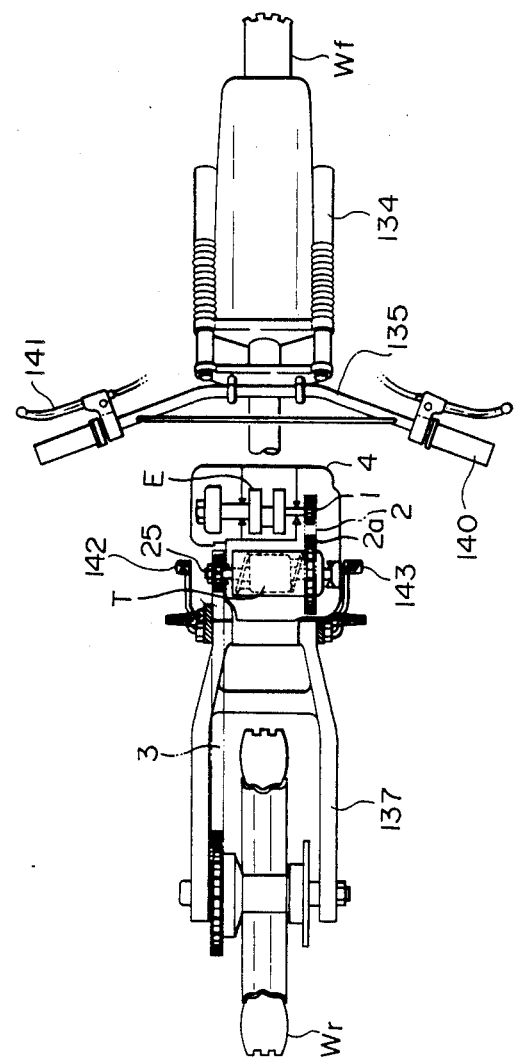
FIG. 3 is a plan view of the motorcycle of FIG. 2.
Figure 4:
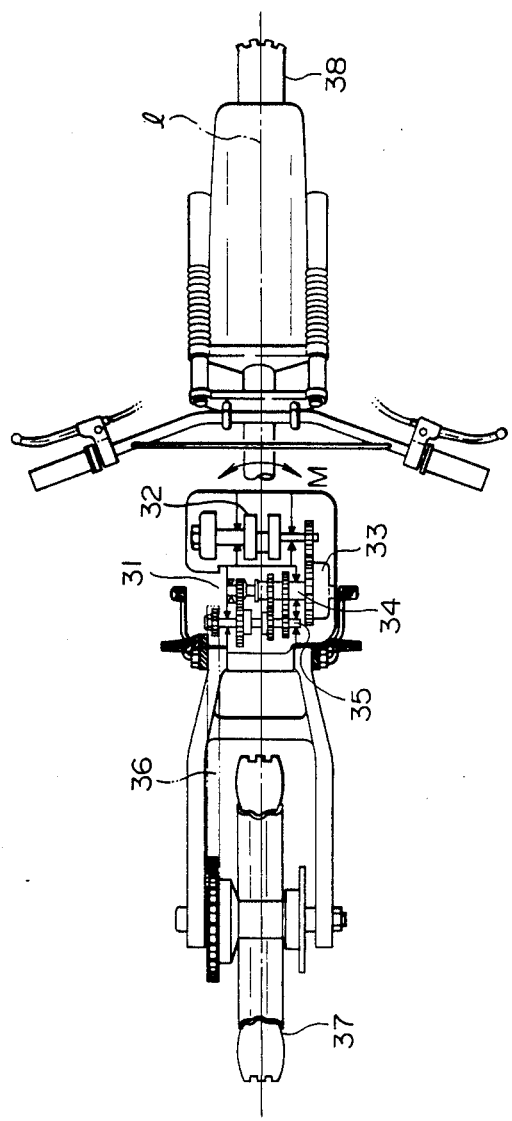
FIG. 4 is a partially cut away plan view of a motorcycle with a conventional transmission.
Figure 5:
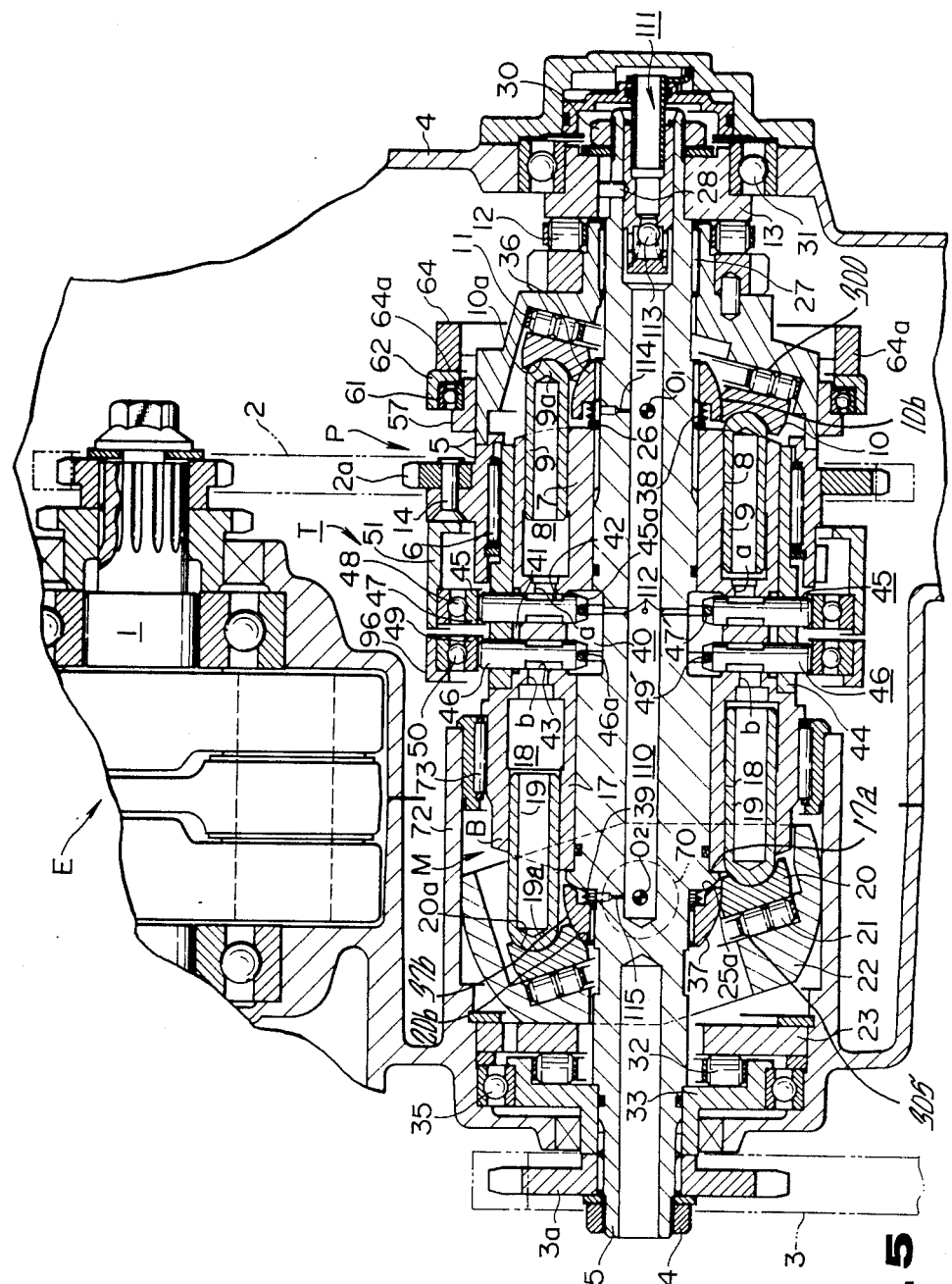
FIG. 5 is a sectional plan view of an automatic transmission to which the present invention may be suitably applied.
Figure 6:
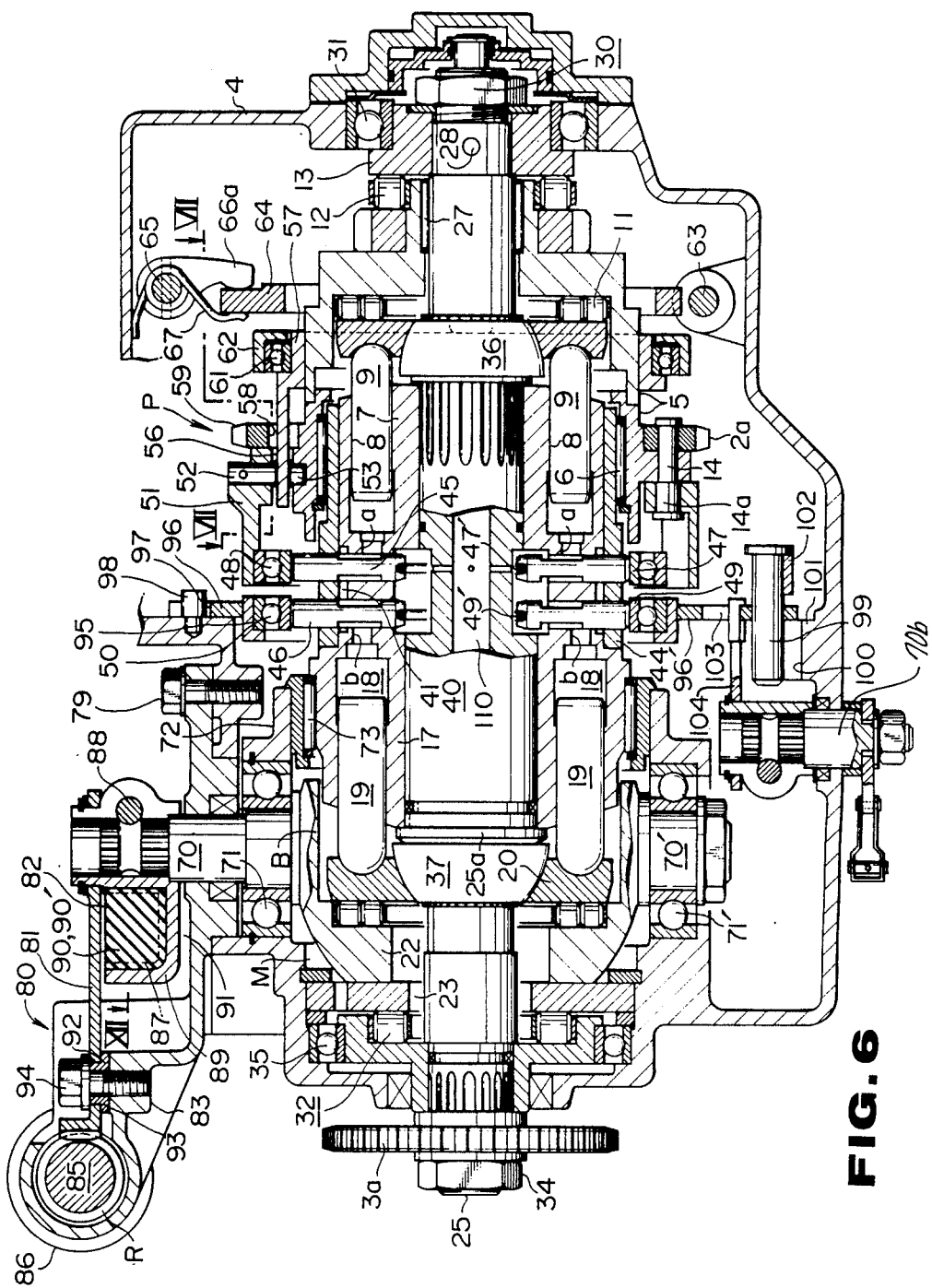
FIG. 6 is a sectional view taken at 90 degrees to the sectional view of FIG. 5.

The automatic transmission shown in FIGS. 5 and 6 is suitably mounted on a vehicle as typically shown in FIGS. 2 and 3. Rotational force generated by an engine (E), in FIGS. 5 and 6, is, first, transmitted generally from the engine (E) to a driving wheel through a crankshaft 1, a primary chain gear mechanism 2 comprising a chain and sprockets, a stepless hydraulic transmission (T) which will be simply as an automatic transmission hereinafter, and a secondary chain gear mechanism 3 comprising a chain and sprockets. The driving wheel is normally a rear wheel in the case of motorcycles.

The stepless hydraulic transmission (T) comprises a constant capacity hydraulic pump mechanism (P) of a tilting plate type, a variable capacity hydraulic motor mechanism (M) of a tilting plate type, and a hydraulic distributor mechanism, which will be referred to simply as a hydraulic pump, hydraulic motor and a hydraulic distributor respectively hereinafter.

Construction of the mechanisms will be explained in order, as follows, referring to FIGS. 5 to 15.

4.1.1 Hydraulic Pump

The hydraulic pump, having an axis therethrough, comprises a primary sprocket 2a of the primary chain gear mechanism 2, a cup shaped torque receiver member 5 having an inclined surface 300 inclined to the axis of the pump, three rivets 14 fixing the torque receiver member 5 to the primary sprocket 2a by threading them together, a pump block 7 accommodated coaxially within the torque receiver member 5, needle bearings 6 located between the pump block 7 and the receiver member 5 for permitting a rotational movement of the former against the latter, an odd number of pump cylinders 8 formed in the pump block 7 along the axis thereof and disposed radially and equi-distantly from the axis, pump plungers 9 received by mating pump cylinders 8 for a leak tight sliding movement thereagainst along the axis thereof and having a round head 9a projecting out of the cylinder 8, a rotatable pump plate 10 having dips 10a for receiving the round heads 9a of the plungers 9 and disposed parallel to the inclined surface 300 of the torque receiver member 5, and thrust roller bearings 11 disposed between the rotatable pump plate 10 and the inclined surface 300 so as to permit a rotational movement of the former against the latter while keeping them parallel to each other. The axis 01 denotes an imaginary trunnion axis, intersecting the axis of the pump body and perpendicular to a plane defined by the axis of the pump body 7 and an axis perpendicular to the inclined surface 300.

A spring (not shown) may be disposed in the cylinder 8 to press the plunger 9 tightly towards the pump plate 10 so that the plunger 9 may follow-up a movement of the rotatable pump plate 10 exactly.

Among the above-mentioned components, the chain gear mechanism, the rivets 14, and the torque receiver member 5 rotate about an axis thereof as one body, which axis coinciding with the axis of the pump body. The pump block 7, pump cylinders 9, and the rotatable pump plate 10 rotate about their axis as one body, the rotational speed of which being different from that of the former tody.

4.1.2 Hydraulic Motor Mechanism

The hydraulic motor mechanism (M) comprises a motor block 17, an axis of which coincides with the axis of the pump (P), and is connected to the block body 7, an odd number of motor cylinders 18 formed in the motor block 17 therealong and disposed radially and equi-distantly from the axis, the motor plungers 19 being received by the mating motor cylinders 18 for a movement therealong and having round heads 19a projecting out of the cylinders 18, a rotatable motor plate 20 having dips 20a receiving the round heads 19a of the motor plungers 19, an inclined plate holder 22 having an inclined surface 305, a thrust roller bearing 21 disposed between the motor plate 20 and the inclined surface 305 of the plate holder 22 so as to secure a rotational movement of the former against the latter, and an anchor plate 23 stopping the plate holder 22 against an axial movement.

The inclined surface 305 of the plate holder 22 is inclined to the axis of the motor (M) forming an angle equal to or smaller than 90 degrees therebetween. The angle is variable between 90 degrees and a smaller angle by rotating the inclined plate holder about a trunnion axis denoted by 02 in FIG. 5. The pump block 7 and the motor block 17 are connected to each other at their opposing faces and form a cylinder block B.

Coil springs (not shown) may be installed in the motor cylinders 18 so as to push the motor plungers 19 against the motor plate 20 and increase the follow-up ability of the plungers 19.

A main shaft 25 is inserted into the cylinder block B so that the axis thereof coincides with the axis of the cylinder block B. The main shaft 25 has a flange 25a projecting therefrom. The flange 25a comes into contact with an inner edge 17a of the motor block 17 and restricts a further axial movement thereof. The cylinder block B is splined to the main shaft 25 so as to eliminate a relative rotational movement therebetween. An opposite inner edge of the cylinder block B is stopped by a circular ring clip 26 which is secured to the main shaft. Thus a rotational and an axial relative movement of the cylinder block B against the main shaft 25 is eliminated and the two members become rotatable as one body about the axis thereof. The main shaft 25 passes through a central part of the torque receiver member 5 and supports it rotatable about the axis by means of needle bearings 27 disposed therebetween.

A stopper plate 13 is secured to an end of the main shaft 25 by means of a key 28 and a nut 30 meshed to the main shaft 25 at the end. The stopper plate 13 is supported by a crankcase 4 through a roller bearing 31 so as to be rotatable around the axis.

The main shaft 25 passes through central portions of the rotatable motor plate 20, inclined plate holder 22, and the anchor plate 23. A stopper plate 33 is splined to the main shaft 25. The stopper plate restricts an axial movement of the inclined plate holder 22 through a thrust roller bearing 32 and is supported by the crankcase 4 rotatable through a roller bearing 35. Thus the main shaft 25 and the cylinder block secured thereto are supported rotatable by the crankcase 4 at both ends of the main shaft 25. The main shaft 25 and the cylinder block B do not exert axial force on the crankcase because the axial force which may occur in the cylinder block is received by the stopper plates 13, 33 and the main shaft 25.

A pump plate adjuster 36 having a hemi-spherical convex surface is splined to the main shaft so as to be dislocatable only in an axial direction and is received by a hemi-spherical hollow space 10b of the rotatable pump plate 10. Because both the adjuster 36 and the hollow space 10b are hemi-spherical, they engage with each other at any tilting angle of the pump plate 10. The adjuster 36 is elastically pressed against the pump plate 10 by means of a belleville spring 38 so that the pump plate 10 is pressed towards the inclined surface 300 of the torque receiver member 5. The other end of the belleville spring 38 is received by the ring clip 26. Further, because an axis of the adjuster 36 is the axis of the main shaft 25, an axis of the pump plate 10 is forced to coincide with that of the main shaft 25.

A rotatable motor plate adjuster 37 having a hemi-spherical convex surface 37b is splined to the main shaft 25 so as to be dislocatable along the main shaft 25 only and the convex surface is received by a hemi-spherical concave surface 20b of the rotating motor plate 20. The adjuster 37 is thrusted against the motor plate 20 by means of a belleville spring 39 which is stopped by the flange 25a at its other end. The adjuster 37 is engageable with the motor plate 20 at any tilting angle of the motor plate 20. The mechanism by which the motor plate 20 is centered to the main shaft 25 is same as that of the pump plate 10.

4.1.3 Hydraulic Distributor Mechanism

A hydraulic distributor mechanism is located between the hydraulic pump mechanism (P) and the hydraulic motor mechanism (M) and serves to control hydraulic flow between the pump (P) and the motor (M). The hydraulic distributor mechanism comprises the cylinder block (B) forming an annular low pressure chamber 40 between itself and the main shaft 25, a cylindrical sleeve 44 holding the cylinder block (B) from outside and forming an annular high pressure chamber 41 between itself and the cylinder block (B), first servo-valves 45 received by radial first valve holes 42 communicating radially the low pressure chamber 40, the pump cylinders 8 and the high pressure chamber 41 by a movement in a radial direction therealong, second servo-valves 46 received by radial second valve holes 43 communicating radially the low pressure chamber 40, the motor cylinders 18 and the high pressure chamber 41.

Distal, or radially outwards, end portions of the first servo-valves 45 are stopped by a first eccentric ring 47 which is located so that the center thereof can be shifted from a central position, wherein the center coincides with that of the main shaft 25, to an eccentric position, wherein the center is dislocated from the center of the main shaft 25. A groove 45a is formed in a proximate, radially inwards, end portion of the first servo-valves 45 and an elastic ring 47', preferably made of steel, is received by the grooves 45a. The elastic ring 47' elastically presses the first servo-valves 45 outwards towards the eccentric ring 47. In a preferred embodiment, the elastic ring 47' is cut apart at a portion so as to permit a thermal expansion thereof.

Distal, radially outwards, end portions of the second servo-valves 46 are stopped by a second eccentric ring 49 which is located so that the center thereof can be shifted from a central position, wherein the center coincides with that of the main shaft 25, to an eccentric position, wherein the center is shifted from the center of the main shaft 25. A groove 46a is formed in a proximate, radially inwards, end portion of the second servo-valves 46 and an elastic ring 49', preferably made of steel, is received by the groove 46a. The elastic ring 49' elastically presses the second servo-valves 46 outwards towards the second eccentric ring 49. In a preferred embodiment, the elastic ring !' is cut apart at a portion so as to permit a thermal expansion thereof. The first servo-valves 45 are in a form shown in FIG. 12. When the first servo-valve 45 is located at its radially outward position in the first valve hole 42, the first servo-valve 45 closes a passage from the pump cylinder 8 to the low pressure chamber 40, and opens a passage from the high pressure chamber 41 to the pump cylinders 8. When the first servo-valve 45 is located at its radially inward position in the first valve hole 42, it closes a passage from the high pressure chamber 41 to the pump cylinder 8, and opens a passage from the pump cylinder 8 to the low pressure chamber 40. When the first servo-valve 45 is located at a midst of the inner and outer positions, it closes both the passage from the high pressure chamber 41 to the pump cylinder 8 and the passage from the pump cylinder 8 to the low pressure chamber 40.

4.1.4 Clutch Mechanism

The first eccentric ring 47 is supported from outwards by a first timing ring 51 through a ball bearing 48 and their centers coincide with each other at a position displaced by a distance e1 from the axis of the main shaft 25. The first eccentric ring 47 is rotatable with respect to the first timing ring 51 connected to the torque receiver member 5 by means of the ball bearing 48 located between them. Therefore, the first servo-valves 45 displace radially as the first timing ring 51 rotates relative to the cylinder block 7. The amplitude e2 of radial movement of the first servo-valves 45 is twice the distance e1.

Figure 7A:
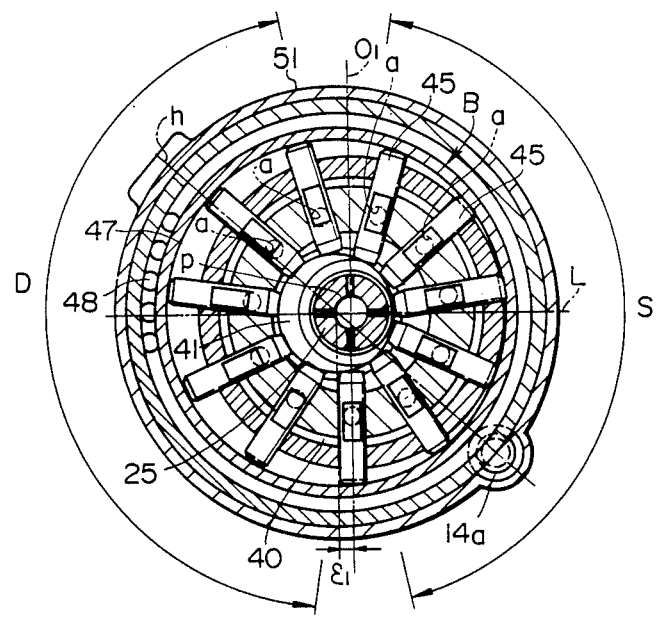
FIG. 7(A) and (B) are sectional views taken perpendicularly to the center axis of the transmission illustrating a primary hydraulic distributor in a clutch-on position and a clutch-off position, respectively.
Figure 7B:
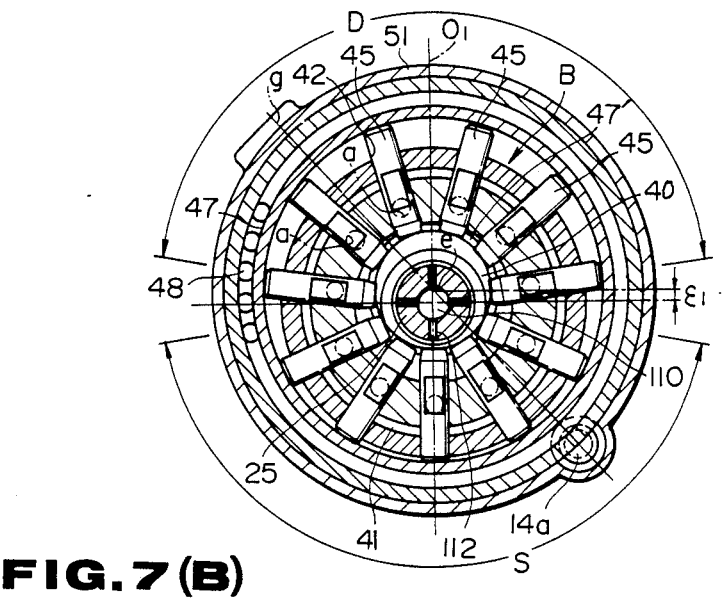
Figure 8:
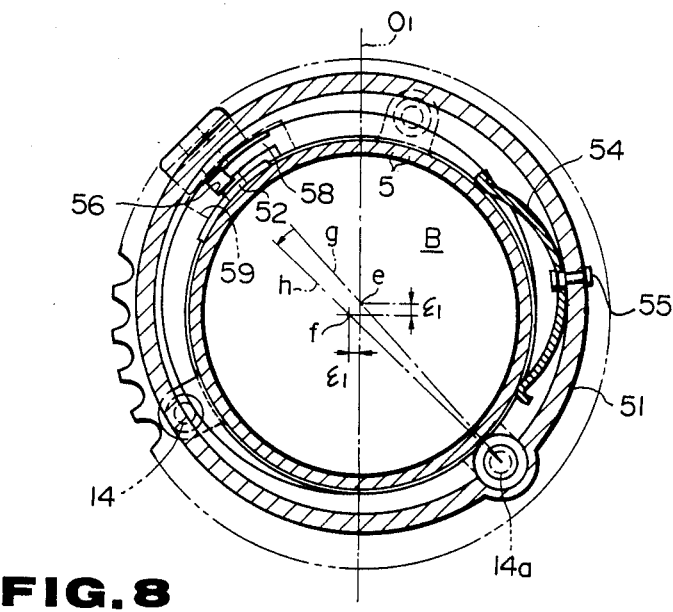
FIG. 8 and FIG. 9 are cross-sectional views illustrating a timing mechanism of the primary hydraulic distributor.
Figure 9:
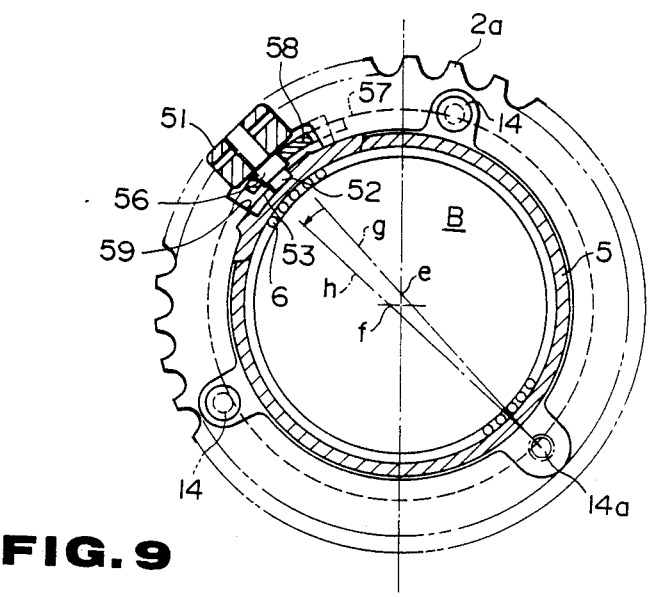

As shown in FIGS. 7(A), 7(B), FIG. 8 and FIG. 9, the first timing ring 51 is pivotally fixed to the torque receiver member 5 by means of one of the three rivets 14(a) threading the ring 51 onto the receiver means 5 through a rivet hole. The ring 51 is capable of swinging about the rivet 14(a). The first timing ring 51 is movable between a clutch-on position (g) as shown in FIG. 7(B) and a clutch-off position (h) as shown in FIG. 7(A) swinging about the pivot 14 as pivotally supported thereby. At the clutch-on position (g), the center of the eccentric ring 47 is dislocated by a distance (e) from the axis of the main shaft 25 in a direction of the trunnion axis 01. At the clutch-off position (h), the center of the eccentric ring 47 is dislocated by a distance (f) from the axis of the main shaft 25 in a direction perpendicular to the axis 01. In order to enable this swinging movement of the first timing ring 51, as shown in FIGS. 8 and 9, a guide pin 52 projects radially inwards from the timing ring 51 and is received loosely by a groove 53 formed in the torque receiving member 5.

An elastic member 54 is located between the timing ring 51 and the torque receiving member 5 so as to elastically force the timing ring 51 towards the clutch-on position (g). The elastic member 54 is fixed to an inner surface of the timing ring 51 at its central portion by means of a rivet 55 and its both ends are in contact with an outer surface of the torque receiver member 5. A roller 56 is fixed to the guide pin 52 as shown in FIGS. 8 to 11 for rotational movement thereabout.

Figure 10:
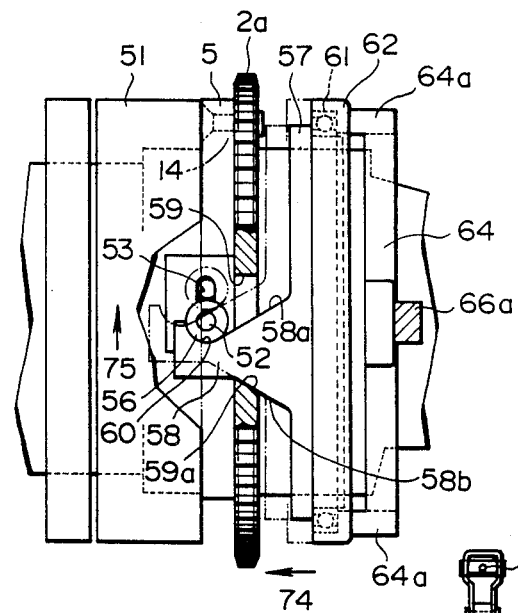
FIG. 10 is a side elevational view of a drive mechanism for the timing mechanism.
Figure 11:
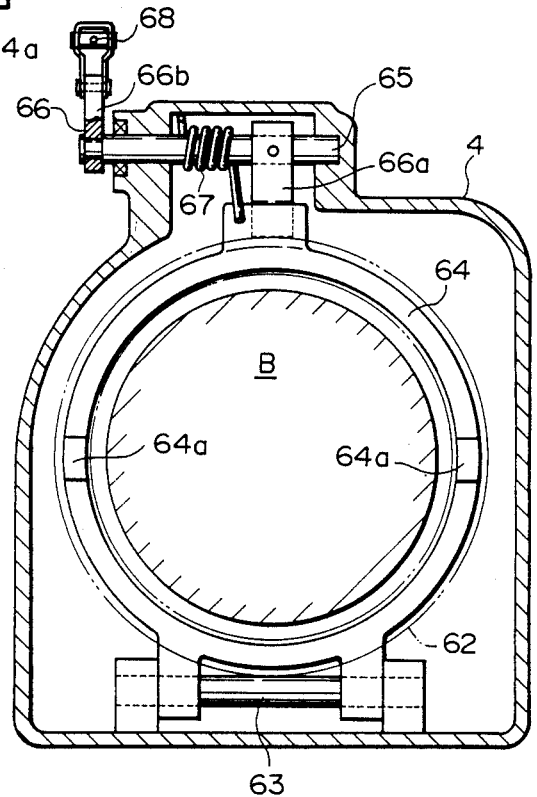
FIG. 11 is a sectional view, of the drive mechanism of the timing mechanism.

As shown in FIGS. 10 and 11, the operation ring 57 is located close to the sprocket 2a on the other side of the first timing ring 51 to hold the torque receiver member 5 from outside in sliding contact therewith axially. An arm 58 projects from the operation ring 57 towards the first timing ring 51 passing through an aperture 59 formed in the sprocket 2a and comes in contact with the guide pin 52.

As show in FIG. 10, both sides of the arm 58 are tapered from the operation ring 57 to a distal end and one of the tapered sides of the arm 58 is in sliding contact with the roller 56 while the operation ring 57 slides along the axis of the main shaft. According to the axial movement of the operation ring 57, the roller 56 is pushed and displaced circumferentially. The arm 58 receives a reaction force constantly from the roller 56 by virtue of the elastic means 54. When the operation ring 57 is apart from the first timing ring 51, a dip 60 formed in a distal portion of the arm 58 to receive the roller 56 engages with the roller 56, and the first timing ring 51 comes to the clutch-on position (g). When the operation ring 57 is located most closely to the timing ring 51, the timing ring is rotated clock-wise as seen from the operation ring 57 and comes to the clutch-off position (h).

As shown in FIGS. 5, 6, 10 and 11, a release bearing 61, a release ring 62 and a clutch ring 64 are attached, in this order, to the operation ring 57 rotatable by means of the release bearing 61. Protrusions 64a of the clutch ring 64, protruding from the clutch ring 64 toward the release ring engage with the release ring 62 for a united axial movement thereof while permitting a relative angular movement therebetween around the protrusions 64a. The release ring 62 and the clutch ring 64 are in contact with the torque receiver member 5 through the release bearing 61 and permit a relative rotational movement therebetween. The release ring 62 is hinge supported at one end from the crankcase 4 by means of a hinge shaft 63. At an opposite side of the clutch ring 64, an inner lever 66a of a bell crank 66, hinge supported from the crankcase 4 by means of a hinge shaft 65, is in touch with an end portion of the clutch ring 64 so as to push the clutch ring 64 towards and away from the release ring 62, as shown in FIGS. 10 and 11. A spring 67 is connected to the same end portion pushing the clutch ring 64 away from the release ring 62.

The bell crank 66 comprises the inner lever 66a located within the crankcase 4 and an outer lever 66b located outside thereof, FIG. 11. An end of a clutch wire 68 is connected to the outer lever 66b, the other end of the clutch wire being connected to a clutch lever 141 (FIG. 3) which is to be operated by a driver or a rider.

When the hinge shaft 65 rotates about the axis thereof, the inner lever 66a pushes the clutch ring 64 towards the release ring 62 and the release ring 62 slides along the axis of the main shaft toward the operation ring 57. Consequently, the arm 58 of the operation ring 57 is thrust into the first timing ring 51 to displace the timing ring eccentrically. According to the above-mentioned embodiment, the first servo-valve 45, elastic ring 47, timing ring 51, operation ring 57, arm 58, release ring 62, clutch lever 141 and bell crank 66 compose a clutch mechanism. The second servo-valves 46 are in a form shown in FIG. 12 identical to the first servo-valves. When the second servo-valve 46 is located at its radially outward position in the second valve hole 43, the second servo-valve 46 closes a passage from the motor cylinder 18 to the low pressure chamber 40, and opens a passage from the high pressure chamber 41 to the motor cylinders 18. When the second servo-valve 46 is located at its radially inward position in the second valve hole, it closes a passage from the high pressure chamber 41 to the motor cylinder 18, and opens a passage from the motor cylinder 18 to the low pressure chamber 40. When the second servo-valve 46 is located at a midst of the inner and outer positions, it closes both the passage from the high pressure chamber 41 to the motor cylinder 18 and the passage from the motor cylinder 18 to the low pressure chamber 40.

As shown in FIGS. 13(A) and 13(B), the second eccentric ring 49 is located around the second servo-valves 46 so as to surround them radially from outside. An elastic ring 49' is inserted in the, grooves 46a formed in a radial inner portion of the second servo-valves 46 so as to thread the second servo-valves 46 and push them outwards towards the eccentric ring 49. The elastic ring 49' restricts a rotation of the second servo-valves about their axes. The second eccentric ring 49 is supported by a roller bearing 50 which is secured to a bearing holder 96.

The second eccentric ring 49 is movable between a first position, FIG. 13(B), wherein a center of the eccentric ring 49 is displaced from the axis of the main shaft 25 in a direction of the axis 02 by a distance of e2, and a second position, FIG. 13(A), wherein the center thereof coincides with the axis of the main shaft.

Thus, as the motor block 17 rotates about the axis, while the second eccentric ring 49 is at the first position, the second servo-valves 46 reciprocate radially within the second valve holes 43, the stroke of the reciprocation being twice the distance e2. As the motor block 17 rotates about the axis, while the second eccentric ring 49 is at the second position, the servo-valves 46 rest at the midst position between the outermost and the innermost positions.

As shown in FIGS. 5, 6, 13(A) and 13(B), the second eccentric ring 49 is supported by the second timing ring 95 rotatable through a roller bearing 50 disposed therebetween. A pair of projections 96a, 96b are projecting outwards from the bearing holder 96 holding tightly the second timing ring 95 from outside in a direction of the second trunnion axis 02 forming a notch 97 therebetween. A guide pin 98 is disposed in the notch 97 to support the bearing holder 96 rotatable thereabout and movably along the trunnion axis 02. At the opposite portion of the bearing holder 96, a projection 96c is formed projecting therefrom. A guide pin 99 threads a distal portion of the projection 96c and is received by a U-shaped notch 100 formed in a support member 101 connected to an inner surface of the crankcase 4 so as to support the bearing holder 96 slidable along the second trunnion axis 02. The position wherein the guide pin 98 comes in contact with a bottom of the notch 97 corresponds to a first position of the second eccentric ring 49 wherein the center thereof is dislocated from the axis of the main shaft 25 by e2. The position wherein the guide pin 99 comes in contact with the bottom of the notch 100 corresponds to the second position wherein the center of the second eccentric ring 49 coincides with the center of the main shaft 25.

A plate spring 102, which is supported rotatable at one end and supported slidable at the other end from the crank case 4, pushes the guide pin 99 in a direction of the trunnion axis 02 so as to push the second eccentric ring 49 to the first position.

Further, a generally rectangular cam hole 103 is formed in the projection 96c and a control lever 104 connected to the trunnion shaft 70b passes therethrough. An outermost edge 103a defining the cam hole 103, with which the control lever 104 is slidable in contact, is slanted to a line perpendicular to the second trunnion axis 02. The control lever 104 is movable in a plane perpendicular to the trunnion axis 02 as the trunnion shaft 70b rotates.

Whereby, the second eccentric ring 49 is slidable along the second trunnion axis 02 between the first and the second positions under an elastic force of the leaf spring 102 pushing the second timing ring 95 towards the first position. As the control lever 104 displaces within the cam hole 103 keeping in contact with the outer edge 103a thereof, the second eccentric ring 49 is displaced from the first position to the second position thereof against a resilient restoring force exerted by the leaf spring 102.

4.1.5 Transmission Ratio Varying Mechanism shown in FIGS. 5 and 6, a pair of trunnion shafts 70, 70', having an axis which coincides with the trunnion axis 02, are connected to the inclined plate holder 22. The trunnion shafts 70, 70' are supported rotatably by a motor housing 72 by means of roller bearings 71, 71'. The housing 72 is unitarily, connected to the crankcase 4. The motor block 17 is also supported rotatably by the motor housing 72 through needle bearings 73.

Figure 14:
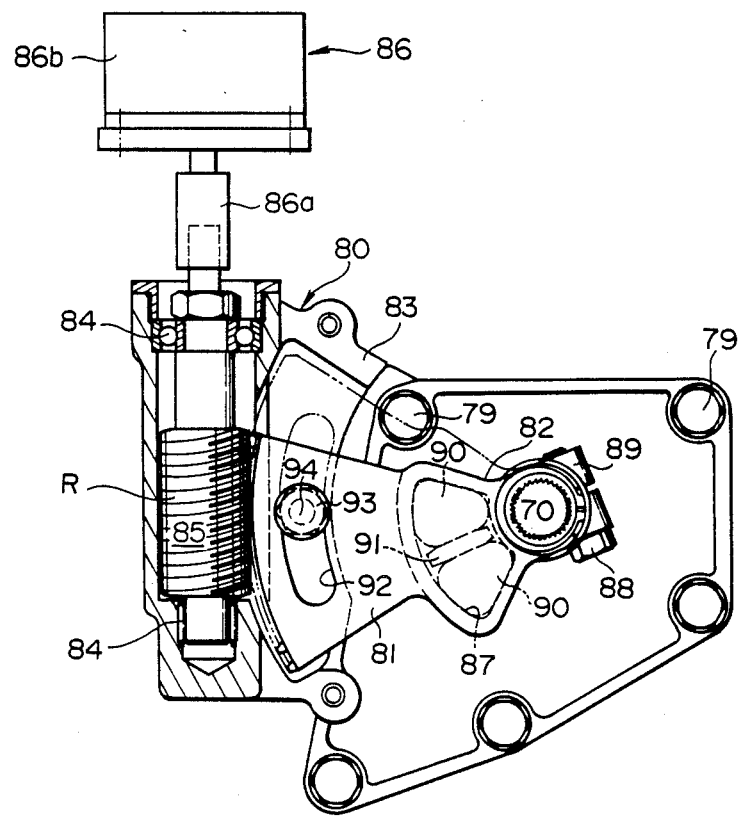
FIG. 14 is a plan view of a transmission ratio varying mechanism.
Figure 15:
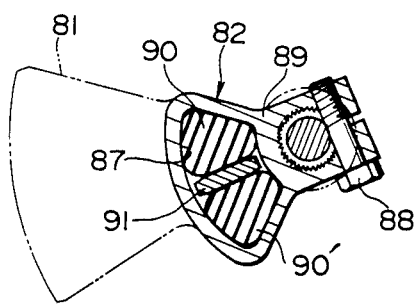
FIG. 15 is a plan view of a cam mechanism of the device of FIG. 14.

The trunnion shaft 70 is connected to a tilt angle adjusting device 80 as shown in FIGS. 6, 14 and 15. The tilt angle adjusting device comprises a sector gear 81 connected to the trunnion shaft 70 for a rotational movement about the trunnion axis and together with the trunnion shaft 70, a damper 82 for resiliently connecting the sector gear 81 to the trunnion shaft 70, a worm gear 85 supported from a bracket plate 83 through bearings 84a, 84b to mesh with the sector gear 81, a DC electric motor 86 having an output shaft 86a connected to the worm gear 85 for forward and reverse rotational movement about an axis thereof. Stator 86b of the electric motor 86 is fixed to the crankcase 4.

Thereby a rotational movement of the motor 86 is transmitted to the trunnion shaft 70 through the worm gear 85, the sector gear 81, an arm plate 91, damper rubbers 90, 90', and a damper frame 89. The sector gear 81 and the worm gear 85 meshingly in contact with each other transmit a rotational movement of the motor 86 to the trunnion shaft 70 for a rotational movement of the trunnion shaft about the trunnion axis. Additionally, they lock a rotational movement of the trunnion shaft 70 when a rotational reaction force is exerted to the trunnion shaft 70 from the inclined plate holder 22. The damper 82 comprises a damper body 89 secured to the trunnion shaft 70 by means of bolts 88 and a fan-shaped damper frame defining a chamber 87 accommodating a pair of damper rubber 90, 90' sandwiching therebetween an arm plate 91 connected to the sector gear 81. A tilt angle of the inclined plate holder 22 is changed by the motor 86.

Reaction force exerted by the motor plungers 19 to the tilt plate holder 22 is transmitted to the sector gear 81 and the worm gear 85 through the trunnion shaft 70. But the reaction force is not transmitted to the motor 86 by the sector gear 81 and the worm gear 85 because a swing movement of the sector gear 81 does not rotate the worm gear 85, as above-mentioned. Fluctuations contained in the reaction force are damped out by means of the resiliency of the damper rubbers 90, 90'. Thus the sector gear 81 and the worm gear 85 are protected from the repeated stressing due to the fluctuating component of the reaction force.

An arc-formed groove 92 is formed in the sector gear 81 and a guide bolt 94 having a guide collar 93 threads the groove slidable so that the sector gear is movable only in a plane perpendicular to the trunnion axis 02.

4.1.6. Hydraulic Circuit

Figure 16:
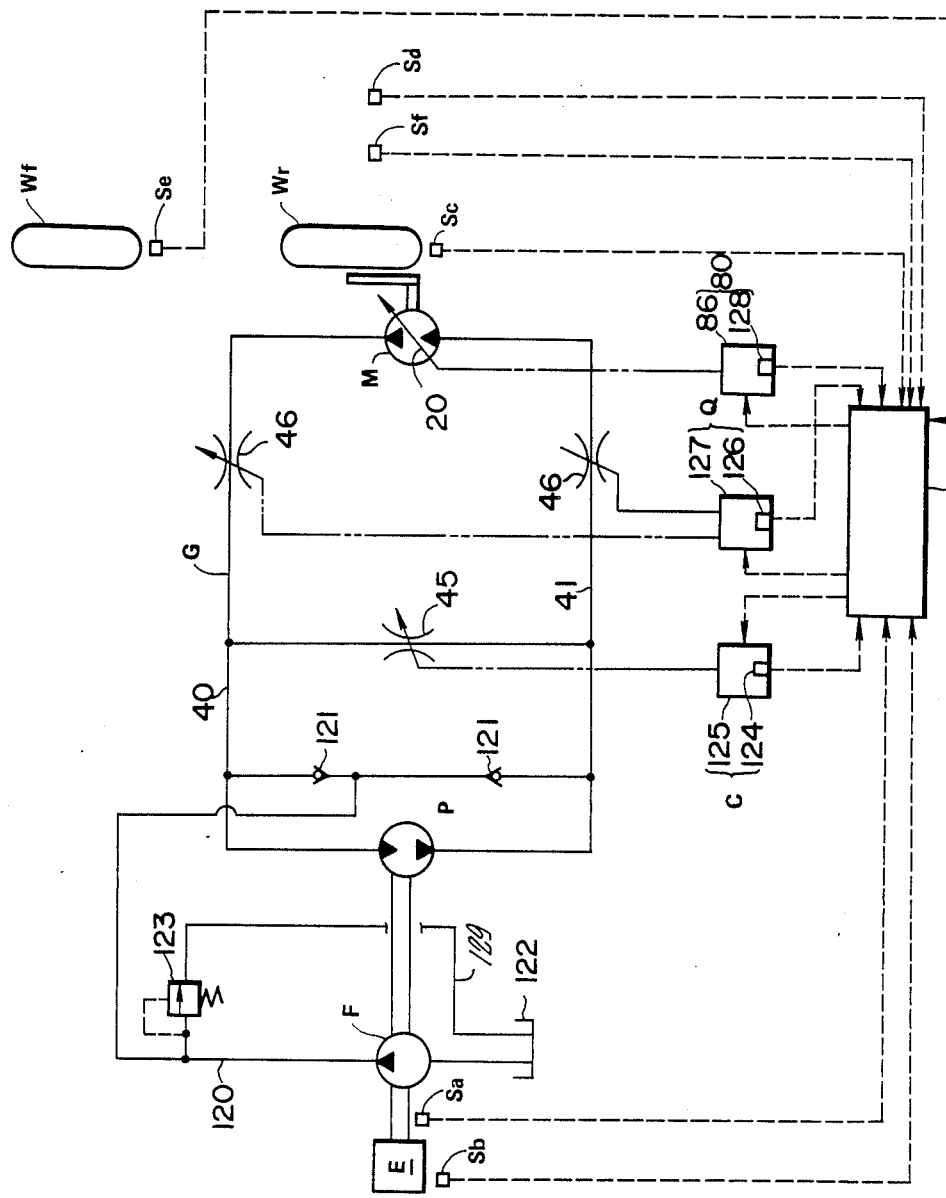
FIG. 16 is a schematic of an oil sensing and data transportation network.

FIG. 16 shows schematically a hydraulic circuit of the above described transmission. An engine (E) drives an oil supply pump (F) for pumping up oil from a tank 122 and supplying the oil to a closed oil circuit (G). A hydraulic pump (P) and a hydraulic motor (M) are included in the closed oil circuit (G) which also comprises a low pressure chamber 40, high pressure chamber 41, first valve holes 42 (not shown), second valve holes 43 (not shown), first servo-valves 45, second servo-valves 46, and a pair of check valves 121. The oil supply pump (F) is connected to the low pressure chamber 40 and the high pressure chamber 41 through an oil feed line 120 and the check valves 121. The oil supply pump (F) pumps up oil from a tank 122 and supplies the oil to the closed circuit (G) through the feed line 120 and the check valves 121 which permit a uni-directional oil flow from the oil supply pump (F) to the circuit (G). A feed back line 129 and a relief valve 123 are connected to the oil feed line 120 so as to regulate the pressure in the oil feed line below a prescribed level.

When the first servo-valves 45 do not permit a hydraulic bypass flow between the high pressure chamber 41 and the low pressure chamber 40, and the second servo-valves 46 permit a hydraulic flow into and from the hydraulic motor (M), a hydraulic circuit passing through the pump (P), high pressure chamber 41, hydraulic motor (M), and low pressure chamber 40 is completed exclusively. This is a normal condition of the transmission wherein a rotational force of the engine is transmitted to the driving wheel. When the first servo-valves 45 are operated to bypass the high pressure chamber 41 to the low pressure chamber 40, a short-cut hydraulic circuit is formed wherein there is no hydraulic flow through the hydraulic motor (M). This is a situation corresponding to clutch off at the clutch mechanism. Thus, the clutch mechanism decides whether or not to transmit a rotational force of the engine to the driving wheel. When the second servo-valves 46 are operated to suppress a hydraulic flow from and into the hydraulic motor, movement of the driving wheel is restricted or stopped by the transmission. Therefore, the transmission is capable of locking the driving wheel without operating an ordinary brake mechanism.

A first hydraulic distributor mechanism, that is a clutch mechanism, (C) comprises a clutch sensor 124 for sensing a position of the first servo-valves 45 and an actuator 125 for determining a position of the first timing ring 51. A second hydraulic distributor mechanism (Q) comprises a position sensor 126 for sensing a position of the second eccentric ring 49 and an actuator for positioning the second eccentric ring 49 with respect to the axis of the main shaft. A tilt angle adjusting device 80 comprises an electric motor 86 and a ratio sensor 128 sensing a tilt angle of the inclined plate holder 22 for measuring a transmission ratio.

A control unit (U) is electrically connected to the clutch mechanism (C), the second hydraulic distributor mechanism (Q) and the tilt angle adjusting mechanism 80. The control unit (U) continuously receives signals from an engine speed sensor (Sa) for sensing a rotational speed (Ne) of the engine (E), a throttle sensor (Sb) for sensing an aperture of the throttle, a second speed sensor (Sc) for sensing a rotational speed of the driving wheel (Wr), a brake sensor (Sd) for sensing an operational condition of the braking mechanism, a gear change sensor Sf for sensing a position of a gear shift lever, and a first speed sensor (Se) for sensing a rotational speed of the non-driving wheel.

4.2 Operation of the Automatic Transmission

Operation of the above-mentioned transmission mechanism is now explained briefly referring to the attached drawings.

4.2.1 Operation of Hydraulic Pump Mechanism

As mentioned above, the torque receiver member 5 and the pump block 7 are able to rotate independently to each other both supported from the crankcase 4. As the rotatable pump plate 10 rotates together with the torque receiver member 5 with respect to the pump block 7, the rotatable pump plate 10 drives the pump plungers 9 to reciprocate in phase therewith within the pump cylinders 8 along the axis thereof. The plungers 9 absorb and discharge oil into and out of the pump cylinders 8 as they move away from and to the first servo-valves 45, respectively. The cycle number of the movement of the plungers 9 is identical to the cycle of the relative rotational movement of the rotatable plate 10 with respect to the pump block 7.

4.2.2 Operation of Hydraulic Motor Mechanism

The round heads 19a of the motor plungers 19 are received by the rotatable motor plate 20 which is supported rotatable in a plane inclined along the axis of the main shaft. Therefore, as oil is pumped into a motor cylinder 18 and the plunger 19 defining the cylinder moves away from a second valve hole 43, the rotatable motor plate 20 transforms the thrust force exerted by the plunger 19 in an axial direction to a rotational force in a plane wherein the motor plate 20 exists and exerts the rotational force on the plunger 19 for a rotation of the motor block 17 together with the pump block 7. Therefore, a rotational speed of the motor block 17 and the pump block 7 about the axis of the main shaft together with the motor plungers 19 and the pump plungers 9 is determined by the reciprocating timing of the motor plungers 19.

4.2.3 Operation of the Servo Valve Mechanism

As the first timing ring 51 is located at the location (g) (FIG. 7b) so as to position the first eccentric ring 47 at the first eccentric position e1, the second bearing holder 96 is located at the position (l) (FIG. 13b) so as to position the second eccentric ring 49 at the second eccentric position e2, and the torque receiver member 5 rotates relative to the pump block 7, the rotatable plate 10 drives the pump plungers 9 reciprocally to perform an oil intake (S) and discharge (D) process repeatedly. Positions of the first servo-valves 45 and the first eccentric ring 47 corresponding to the oil intake and the oil discharge procedures are shown in FIGS. 7(A) and 7(B). The first servo-valves 45 are driven radially outwards by the first eccentric ring 47 and the elastic ring 47' to open a hydraulic passage from the pump cylinders 8 to the high pressure chamber 41 while the pump plungers 9 are in the discharging process (D). In other words, movement of the first servo-valves 45 are synchronized with a relative rotational movement of the pump body 7 to the torque receiver member 5. The first servo-valves 45 are driven radially inwards by the first eccentric ring 47 and the elastic ring 47' while the pump plungers 9 are in the oil intake process (S) to open a hydraulic passage from the low pressure chamber 40 to the pump cylinders 8. Thus, oil is introduced from the low pressure chamber 40 to the pump cylinder 8 while the plungers 9 are in the intake process (S), and oil is pushed out from the pump cylinder 9 to the high pressure chamber 41 while the pump plungers 9 are in the discharge process (D). As the eccentric ring 47 rotates, nearly half of the first servo-valves 45 are in the intake process (S), and another nearly half of the first servo-valves 45 are in the discharge process. Because the high pressure chamber 41 is in an annular form to which the pump cylinders 8 are communicated through the first valve holes, oil is discharged continuously by one or more of the pump cylinders 8 to the high pressure chamber 41, consequently, keeping high the pressure in the high pressure chamber 41.

The second eccentric ring 49 rotates about the axis of the main shaft 25, synchronized with the rotation of the motor body 17. The second servo-valves 46 reciprocate radially in accordance with the eccentric rotational movement of the second eccentric ring 49. Nearly half of the second eccentric rings are in the radial outward position while the other nearly half of them are in the radial inward position. As to second servo-valves, they reciprocate one cycle while the hydraulic motor (M) rotates one turn. Accordingly, oil in the high pressure chamber 41 is lead into nearly half of the motor cylinders 18 through the motor ports 43 which are currently communicated to the high pressure chamber 41 by virtue of a radially outward position of the second servo-valve 46. Oil in the other nearly half of the motor cylinders 18 is lead into the low pressure chamber 40 as the corresponding servo-valves 46 are at a radially inward position. Consequently, the motor plungers 19 reciprocate one cycle as the motor body 17 rotates one cycle, each motor plunger being out of phase from each other, and having a constant phase difference from one to the other. The reciprocal movement of the motor plungers 19 gives a rotational driving force to the motor body 17.

Similarly, the oil discharged from the motor cylinder is lead to the low pressure chamber 40 as the second servo-valves 46 are located radially inwards, and then absorbed into the pump cylinder 8 as the first servo-valves are located radially inwards.

4.2.4 Operation of Clutch Mechanism

If the clutch ring 64 is displaced towards the release ring 62 against a resilient force of the spring 67 by means of an operation of the clutch lever 141, the release ring pushes the operation ring 57 through the release bearing 61 leftwards and drives the arm 58 into the aperture of the sprocket 2a, FIGS. 10 and 11. As the slanting surface 59a of the aperture 59 pushes the slanting surface 58b of the arm 58 and slanting surface 58a pushes the roller 56 according to an axial displacement (denoted by an arrow 74 in FIG. 10) of the operation ring 57, the roller 56 is displaced eccentric in a direction (denoted by an arrow 75 in FIG. 10). Thus the first control ring 51 is moved from a clutch-on position (G) to a clutch-off position (F) according to an operation of the clutch lever 141.

As a result, operation of the first servo-valves 45 become out of phase by 90 degrees compared to the former case. Position of the first servo-valves 45 are shown together for an intake (S) and discharge (D) process of the pump cylinders 8, in FIG. 7(A). As shown in the figure, the pump cylinders 8 are connected to the high pressure chamber 41 during generally half in time of the discharge (D) process and to the low pressure chamber 40 during another half in time of the process. In other words, while oil is being discharged from some of the pump cylinders 8 to the high pressure chamber 41, the oil is being absorbed by other pump cylinders 8. The oil circulates within the pump cylinders 8, the high pressure chamber 41, the low pressure chamber 40, and the first valve holes without flowing into the motor cylinders 19. Therefore, rotational force of the engine (E) is not transmitted to the main shaft, that is, the clutch-off position of the clutch mechanism.

The first eccentric ring 45 is not necessarily positioned at the above-mentioned two positions but it can take intermediate positions also, that is, positions out of phase from the first position by an angle larger than zero and smaller than 90 degrees. In such cases, only a portion of the driving force of the engine (E) is transmitted to the driving wheel. The operation corresponds to a so called half-clutch operation used on a ordinary manual transmission.

4.2.5 Operation of the Transmission Ratio Varying Mechanism

Displacement volume of a motor cylinder 18 corresponding to a reciprocal movement of the motor plunger 19 is proportional to its stroke, consequently, it is a function of the tilt angle of the rotatable motor plate 20. Therefore, a total volume of oil absorbed in or discharged from the motor cylinders 18 while the motor block 17 rotates one cycle respective to the crankcase 4 is a function of the tilt angle of the inclined plate holder 22. On the other hand, a total volume of oil discharged by or absorbed in the pump cylinders 9 while the pump block 7 rotates one cycle is a function of a rotational speed of the pump block 7 (or similarly of the motor block 17) relative to the torque receiver member 5.

More precisely, there is a relation between the rotational speed (Nm) of the motor block, capacity of the motor cylinder (Cm) which is a function of the tilt angle of the rotatable motor plate 20, number of motor cylinders (Nmc) in the motor block 17, rotational speed of the torque receiver member (Nr), capacity of a pump cylinder (Cp), and number of pump cylinders (Npc) in the pump block 7, as follows. The equation is based on the fact that the amount of oil discharged by the pump cylinders 8 is absorbed in the motor cylinders 18.

$$Nm\ Cm\ Nmc = (Nr - Nm)\ Cp\ Npc$$

Therefore, a rotational speed of the motor block 17, consequently a rotational speed of the main shaft 25, is expressed as follows by a simple mathematical operation.

$$Nm = Nr\ Cp\ Npc/(Cm\ Nmc + Cp\ Npc)$$

Rotational speed of the main shaft is a function of the tilt angle of the rotatable motor plate 20 while the rotational speed of the torque receiver member 5 is constant because the capacity of the motor cylinder Cm is a function of the tilt angle. Thus the transmission ratio of the stepless automatic transmission is varied by varying the tilt angle.

In other words, the transmission ratio $R\ (=Nr/Nm)$ is expressed as follows.

$$R = Nr/Nm = 1 + (Cp\ Npc/Cm\ Nmc)$$

Thus the transmission ratio (R) varies stepless from 1 to a larger value by changing the tilt angle of the rotatable motor plate 20.

While in operation, the rotatable pump plate 10 receives a reaction force component in an axial direction from the pump plungers 9. The rotatable motor plate 20 receives a reaction force in an axial direction from the motor plungers 19. The reaction force acting on the rotatable pump plate 10 is received by the main shaft 25 through the thrust roller bearing 11, torque receiver member 5, thrust roller bearing 12, stopper plate 13, and the nut 30. The reaction force acting on the rotatable motor plate 20 is also received by the main shaft 25 through the thrust roller bearing 21, inclined plate holder 22, anchor plate 23, thrust roller bearing 32, stopper plate 33, output sprocket 3a and the nut 34. Therefore, a couple of axial reaction forces acting on the rotatable pump plate 10 and the rotatable motor plate 20 causes only tensile stress of the main shaft 25, and does not exert force on the crankcase 4.

FIGS. 2 and 3 show an example of a motorcycle to which the above mentioned automatic transmission is mounted. The motorcycle comprises a frame 130, an engine (E) and a stepless automatic transmission (T) mounted at a rear side of the engine (E). The main shaft of the transmission (T) is disposed parallel to the crank shaft of the engine (E) perpendicular to the longitudinal axis of the motorcycle.

The motorcycle comprises also a non-drive wheel (Wf), a drive wheel Wr to which rotational force of the engine (E) is transmitted through the transmission (T), a fuel tank 131 mounted at a front part of the frame 130, a seat rail 130a, and a seat 132 fixed to the seat rail 130a. The non-drive wheel (Wf) is supported rotatable at a lower end of a pair of front forks 134. A handle 135 connected to the front forks 134 is located at a top of head pipes 133. The drive wheel (Wr) is supported rotatable at a distal end portion of a swing arm 137 which swings against the frame 130 under a restoring force of a cushion unit 136. The drive wheel (Wr) is connected to the main shaft of the stepless automatic transmission (T) through a secondary transmission mechanism 3 located at a left side of the motorcycle.

An air cleaner 138, an exhaust pipe 139, an accelerator grip 140, a clutch lever 141, and brake pedals 142, 143 are also comprised by the motorcycle. Either of the brake pedals 142, 143 exerts a braking force to the wheels.

The automatic transmission and the crankshaft may be so disposed that gravity centers thereof coincide with a plane of symmetry of the motorcycle and that a rotational direction thereof coincides with a rotational direction of the wheels. According to the construction, when the motorcycle is accelerated, the weight of the motorcycle shared by the driving wheel increases to secure a better grip of the ground by virtue of a reaction moment caused by the crankshaft and the transmission. Further, a quick acceleration does not exert a transversal overturning moment to the motorcycle because the gravity centers coincide with a plane of symmetry of the motorcycle.

4.3 Control of the Automatic Transmission

Now, control of the automatic transmission according to the present invention is explained referring to the attached drawings.

Control method of an automatic transmission according to the present invention is three fold, in general, that is, an initial stage control, a spacial stage control, and a normal stage control.

The initial stage control is performed prior to the others while a speed of the vehicle is lower than a prescribed level. The initial stage control comprises varied operations which are to be performed at an early stage. An object of the initial stage control is to assure a quick acceleration of the vehicle until it comes to a prescribed speed. To that end, transmission ratio is controlled by control operations such as a control unit, automatically. The initial stage control comprises one or a plurality of initialization, fail safe control, shoving start control, and start-up control which are denoted by having a letter (a) in the name. Each control is explained in detail later.

The special stage control is performed on condition that the state of the vehicle gets out of the initial stage control. The special stage control corresponds to a status wherein a transmission of the driving force is disconnected between the engine and the ground, for example, while the vehicle is jumping, slipping, or the clutch is set off. Under such conditions, transmission ratio is controlled so that the rotational speed of the driving wheel coincides with an actual speed of the vehicle in order that the driving wheel recovers a grip of the ground most quickly and smoothly. The special stage control includes one or a plurality of the following operations such as a jumping control, a lock-slip control, and an inertial, running control which are denoted by having a letter (b) in the name.

On condition that the situation of the vehicle is out of control covered by the above-mentioned initial stage control or special stage control, the normal stage control starts to control transmission ratio wherein the transmission ratio is determined so that an operation of the driver or rider is reflected to the movement of the vehicle as quickly and correctly as possible. The normal stage control comprises one or both of a transmission brake control and a normal control which are denoted by a name letter (c) in the letter.

4.3.1 Initialization (step a-0)

Figure 17:
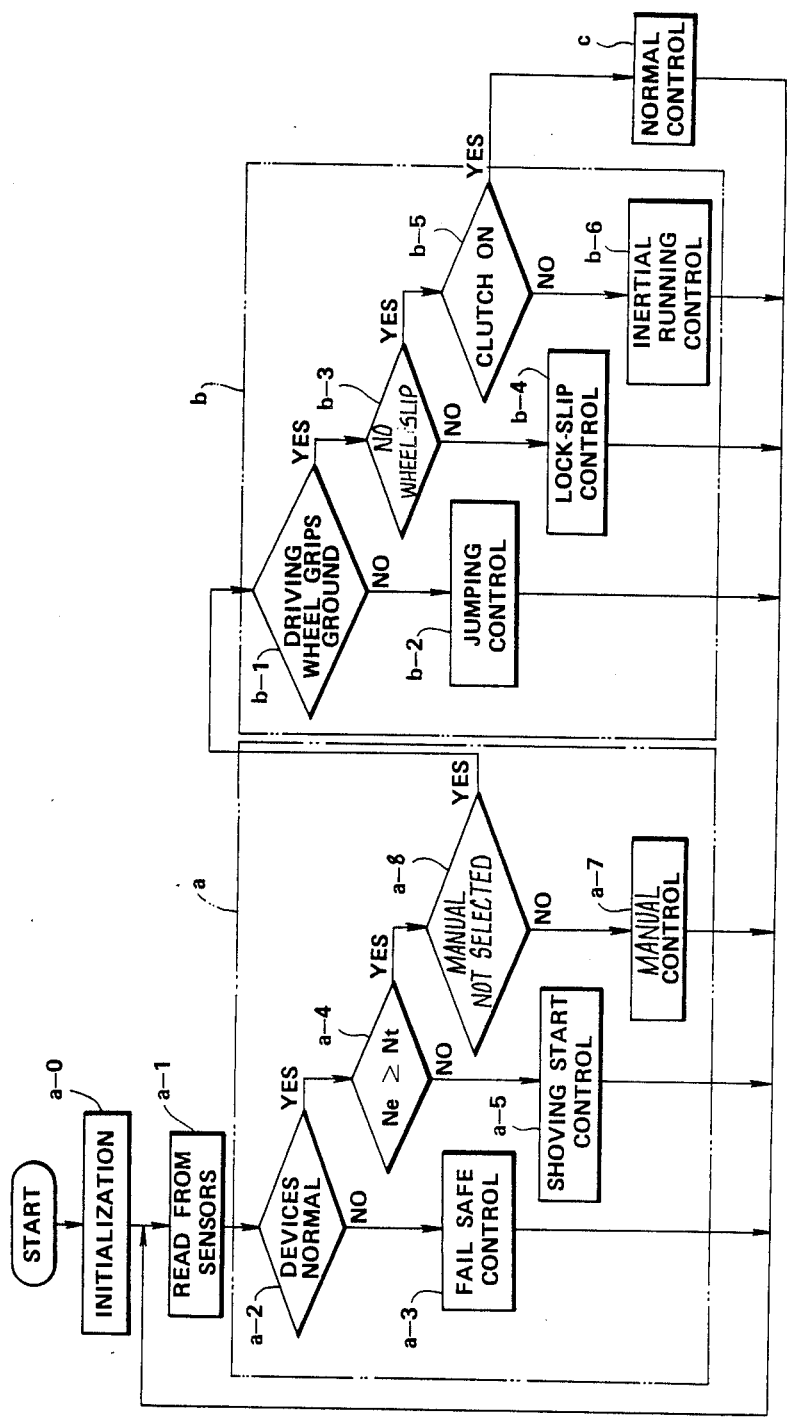
FIG. 17 is a control procedure flow chart for an embodiment of the present invention.

First of all, the control unit (U) is initialized before receiving data from the sensors at the step of initialization a-0, FIG. 17. The initialization may include a clearing off of a memory, reading of a preset program, etc.

4.3.2 Data Acquisition from Sensors (a-1)

Sensors are activated to send predetermined sensing data to the control unit. The control unit receives the data from the sensors. The sensors are engine speed sensor Sa, the throttle sensor Sb, the second speed sensor Sc, the brake sensor Sd, the first speed sensor Se, the change sensor Sf, the clutch sensor 124, the position sensor 126, and the ratio sensor 128, for example.

4.3.3 Fail-safe Control (a-2 and a-3)

The control unit (U) judges whether or not the sensors and the mechanisms of which an operational condition is sensed by respective sensors are in a normal condition based on the data sent by the sensors. If at least one of the sensors or the mechanisms is found to be out of order, the control unit (U) judges that the system, including mechanisms, sensors and control unit, is not in a normal condition, and proceeds to a prescribed fail-safe step (a-3). If all the sensors and the mechanisms are in good order, the control unit (U) judges that the system is in good condition and proceeds to a shoving start control step, (a-4).

In the fail-safe step (a-3), the control unit (U) controls the system so that the driving force is not transmitted to the driving wheel (Wr) inadvertently, indicates that the system is not in good order, returns to the step (a-1) for data acquisition from sensors, and waits until the problem in the system is recovered.

4.3.4 Shoving Start Control (a-4, a-5)

Figure 18:
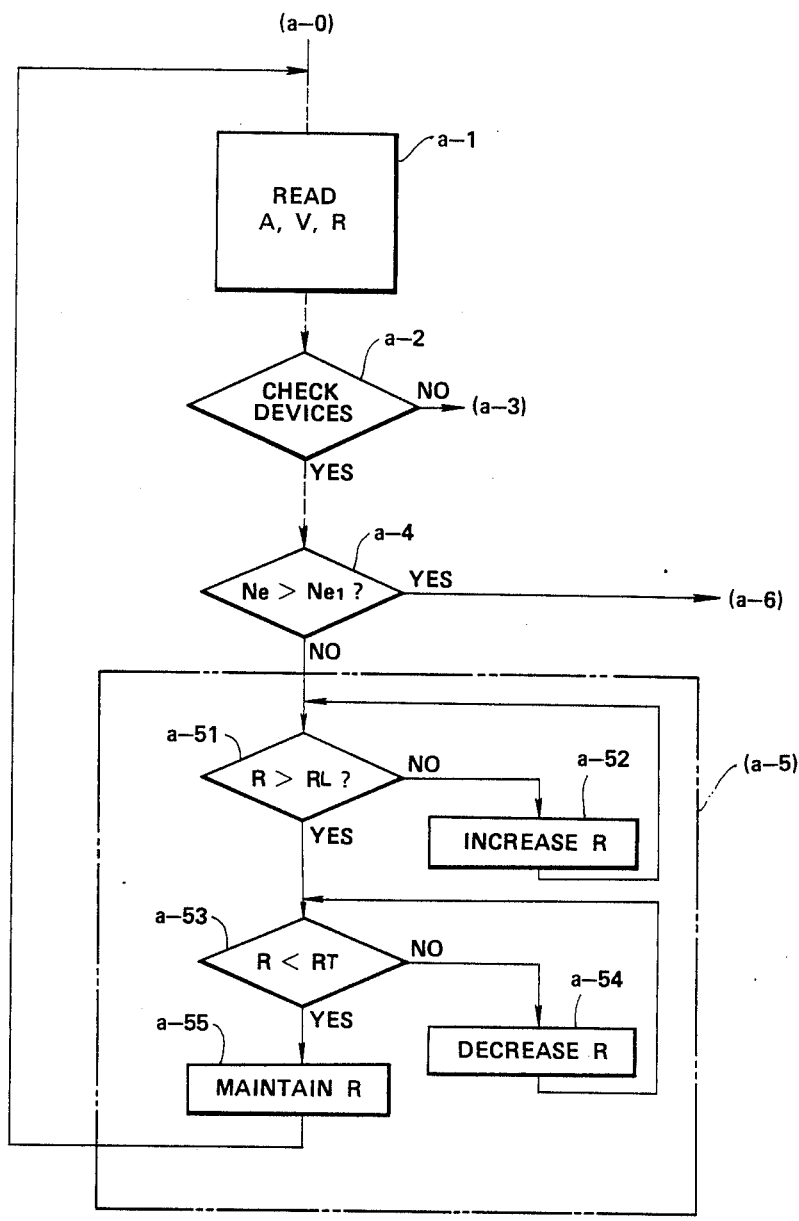
FIG. 18 is a flow chart showing a control procedure in a shoving start.

If the control unit judges that the system is in good order, then the control of the system proceeds to the shoving start control (a-4, a-5) and the control unit judges whether or not the rotational speed of the engine (E) is higher than a prescribed value (Ne1) which is normally a value larger than zero and lower than an idling speed of the Engine (E), FIG. 18. The control gets out of the shoving control procedure and proceeds to a start up control procedure if the rotational speed of the engine (f) is higher than (Ne1). Otherwise the control unit (U) judges that the engine should be started, subsequently by shoving (a-4).

Then the control unit (U) compares actual transmission ratio (R) with a prescribed transmission ratio (RL), in step (a-51). If the actual transmission ratio (R) is equal to or lower than the prescribed ratio (RL), the control unit (U) send a signal to the tilt angle adjusting device 80 to increase the transmission ratio (R), in step (a-52), and returns to the above-mentioned step (a-51). If the actual transmission ratio (R) is larger than the prescribed ratio (RL), the control proceeds to the step (a-53).

At the step (a-53), the control unit (U) compares the actual transmission ratio (R) with a prescribed ratio (RT). If (R) is equal to or larger than (RT), the control unit (U) send a signal to the tilt angle adjusting device 80 so as to decrease the transmission ratio, in step (a-54), and returns to the step (a-53). If (R) is smaller than (RT), the control unit (U) returns to step (a-b 1) while maintaining the transmission ratio (R).

According to the above-mentioned procedure, transmission ratio (R) is set within a prescribed range of values between (RL) and (RT) according to a judgement that the engine is to be started by shoving the vehicle. The range of transmission ratio is determined so as to give suitable torque and speed to the engine by shoving the vehicle by human power. The shoving start procedure is as follows. First, the vehicle is shoved to move by human power while setting off the clutch by an operation of a clutch lever. Next, when the speed of the vehicle reaches a certain level, the clutch is set on suddenly. By the operation, inertial moment of the vehicle is transmitted to the engine to rotate the crankshaft and the engine is started. If the transmission ratio in the shoving start is too high, the vehicle is braked suddenly and the driving wheel slips when the clutch is set on. So, the engine is not started effectively. On the other hand, if the transmission ratio is too low, rotation of the engine is insufficient to get started. Therefore, the transmission ratio has to be set at an intermediate value, corresponding to a second or a third gear ratio in a manual transmission, in the shoving start control. The engine can be also started by the shoving start control when the engine stops inadvertently while the vehicle is running at a low speed. In such a case, the transmission ratio is reset at a value which is suitable to restart the engine automatically. Therefore, the engine is restarted without any operation of the driver.

4.3.5 Start-up Control (a-6, a-7)

Figure 19:
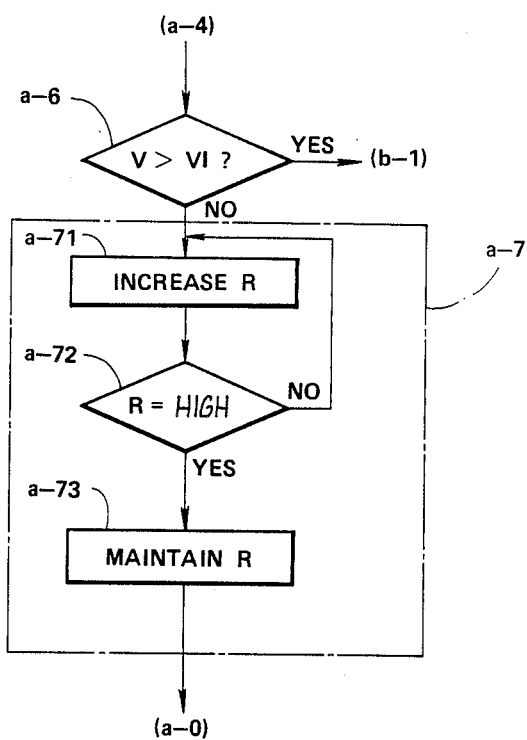
FIG. 19 is a flow chart showing a control procedure in a start up.
Figure 20:
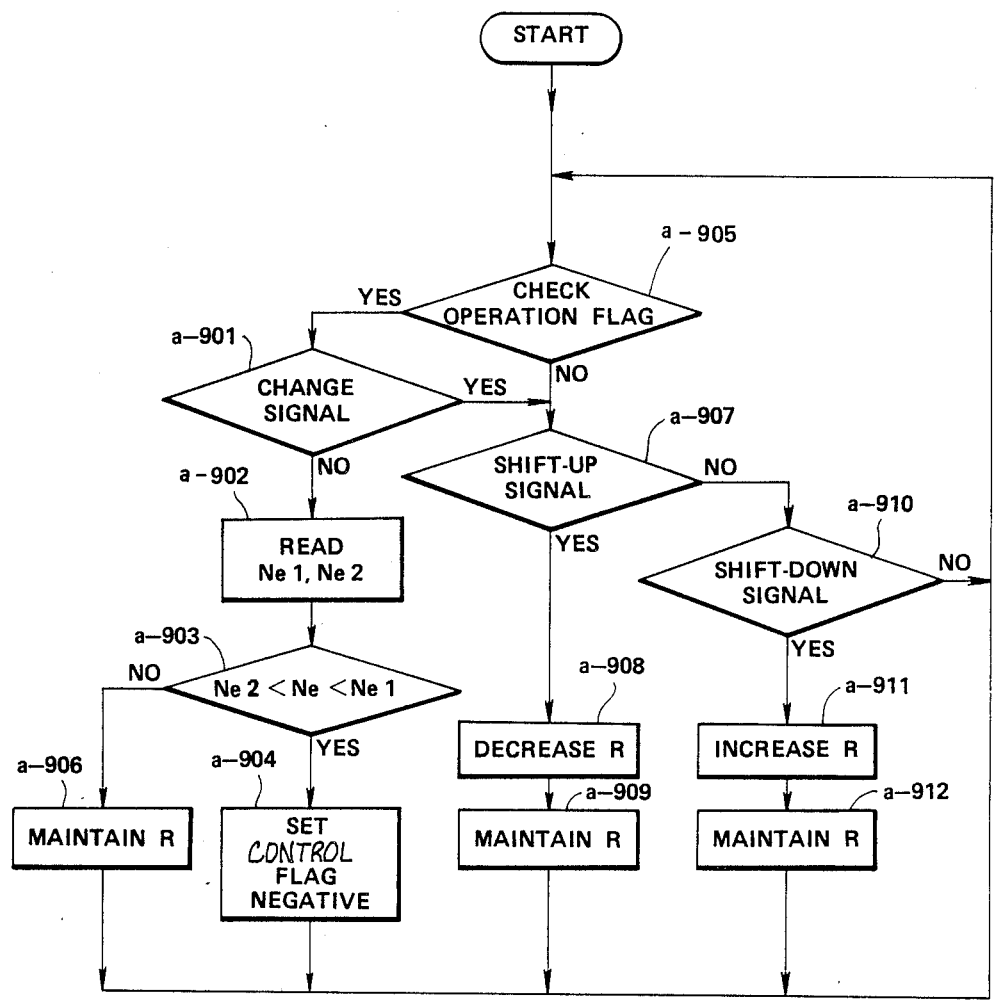
FIG. 20 is a flow chart showing a control procedure allowing manual control.

A start-up control (a-6, a-7) is explained with reference to FIG. 19. The start-up control starts on condition that a rotational speed of the engine (E) is higher than a prescribed value, in step (a-4).

First, the control unit (U) compares the current speed (V) of the motorcycle on the basis of data from the first speed sensor Se with a prescribed speed (V1), step (a-6). If (V) is larger than (V1), the control proceeds to step (b-1). If (V) is equal to or smaller than (V1), the control proceeds to the following steps.

The control unit (U) send a control signal to the tilt angle adjusting device 80 and make the device increase the transmission ratio, and then proceeds to the next step, in step (a-71).

The control unit (U) judges whether or not the current transmission ratio is equal to a highest ratio and, returns to step (a-71) when the judgement is negative and proceeds to the next step when the judgement is positive, in step (a-72).

The transmission ratio is kept unchanged and returns to step (a-b 1), in step (a-73).

By virtue of this start-up control, the transmission ratio is kept to a largest value on condition that the speed of the motorcycle is lower than a prescribed value. In other words, the control unit (U) judges that the motorcycle is to be accelerated on condition that the speed thereof is low, and enables a prompt acceleration thereof by keeping the transmission ratio high.

Further, because the shoving start control is performed prior to the start-up control, if the engine (E) stops accidentally, the transmission ratio is set to an intermediate value for a smooth restart of the engine (E) and then set to a high ratio for a quick recovery of the speed if the speed of the motorcycle is low.

At step (a-72), current transmission ratio (R) may be compared with an objective value (R71) which is determined in accordance with a speed of the vehicle and an engine speed. In the case also, the control returns to step (a-71) if (R) is smaller than (R71). Otherwise, the control proceeds to step (a-73).

4.3.6 Manual Control (a-8, a-9)

In some cases, it is desired to shift the transmission ratio according to an operation of the driver. In order to meet with the requirement, a manual control may be located between the shoving start control and the start-up control, FIG. 17 and FIG. 20.

The manual control starts on condition that the engine speed is higher than a prescribed level at step (a-4). In such a case, transmission ratio is altered according to an operation of the driver and kept as it is while a signal to keep the transmission ratio is emitted by the driver. The procedure is explained in more detail as follows.

The control unit judges whether or not the system has been in the manual control procedure according to the control flag which is set negative at the initialization step. Then proceeds to step (a-901) if the judgement is positive, or proceeds to step (a-907) if the judgement is negative.

At step (a-907), if the control unit receives a shiftup signal from a manual shift lever, the control proceeds to step (a-908). Otherwise, the control proceeds to step (a-910).

At step (a-908), the control unit sends a control signal to the transmission ratio varying mechanism to decrease the transmission ratio by a prescribed increment.

Subsequently, at step (a-909), the control unit sets a flag positive so as to indicate that the system is already in the manual control procedure.

At step (a-910), if the control unit receives a shift down signal from the manual shift lever, the control proceeds to step (a-911). Otherwise, that is, when neither a shift up signal nor a shift down signal is emitted, the control returns to step (a-b 1).

At step (a-911), the control unit sends a signal to the transmission ratio varying mechanism to increase the transmission ratio by a prescribed increment.

Subsequently, at step (a-912), the control sets the operation flag positive and returns to step (a-b 1).

At step (a-901), the control unit judges whether or not a new shift signal is received. If the judgement is positive, the control proceeds to step (a-907) and follows the above-mentioned procedure. If the judgement is negative, that is, if no further signal is received, the control proceeds to step (a-902).

At step (a-902), the control unit reads a highest and a lowest suitable rotational speed, (Ne1) and (Ne2) respectively, from a prescribed relation between (Ne1), (Ne2) and transmission ratio (R).

At step (a-903), the control unit judges whether or not the current engine speed falls between (Ne1) and (Ne2). If the judgement is negative, the control proceeds to step (a-906). Otherwise, the control proceeds to step (a-904).

At step (a-906), the control unit keeps the current transmission ratio and returns to step (a-b 1).

At step (a-904), the control unit sets the control flag negative and returns to step (a-b 1).

Operation of the above-mentioned manual control is explained as follows.

If a shift down signal is emitted by operating a shift lever, the control arrives at step (a-911) and the transmission ratio is increased therein. If a shift up signal is emitted, the transmission ratio is decreased at step (a-908). Once a combination of the engine speed and the transmission ratio gets out of a range described in step (a-903), the combination is kept until a further shift signal is emitted or the combination falls in the range by itself.

Accordingly, the driver can shift up and down at any time irrespective of the automatic control condition. Once the transmission ratio is shifted manually, the ratio is kept, in general, until further manual operation is performed. By virtue of the manual control, a very delicate control of the vehicle becomes possible.

4.3.7 Jump Control

Figure 21:
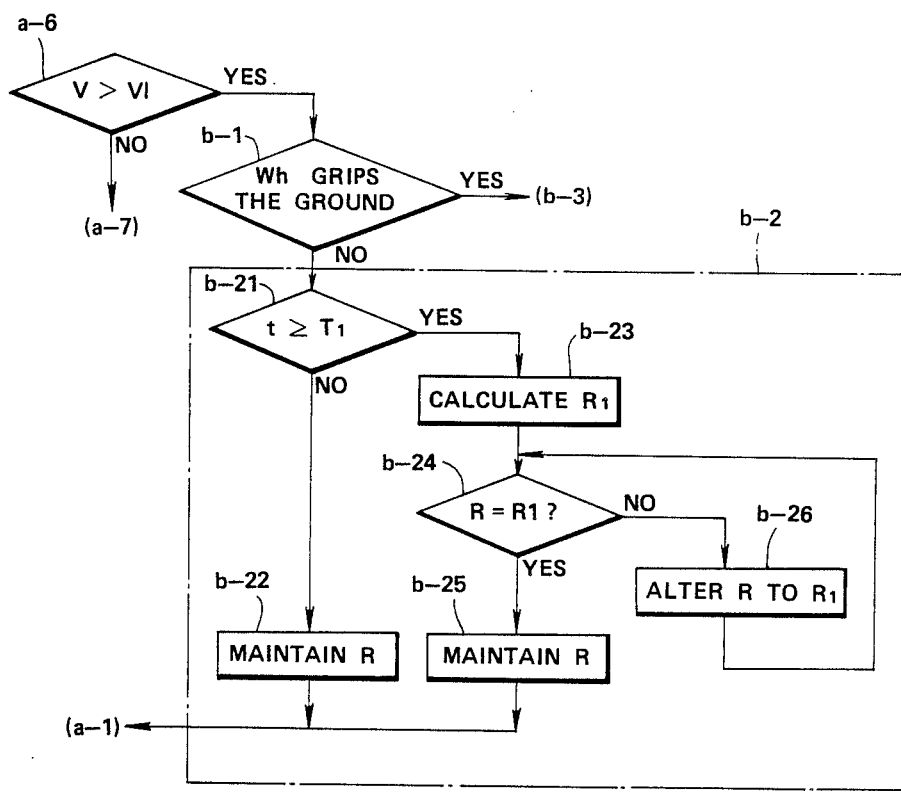
FIG. 21 is a flow chart showing a modified control of a jump.
Figure 22:
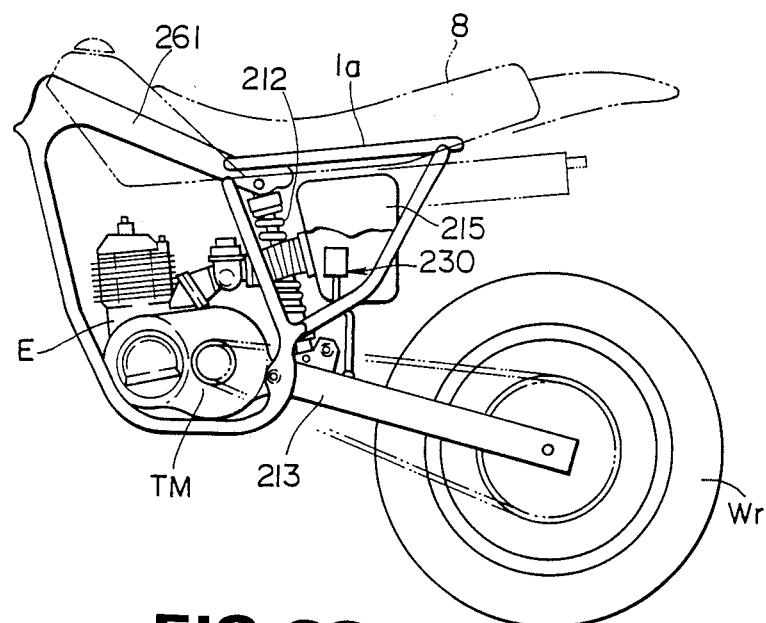
FIG. 22 shows a side view of a portion of a motorcycle with a mechanism for detecting a jumping of the vehicle.
Figure 23:
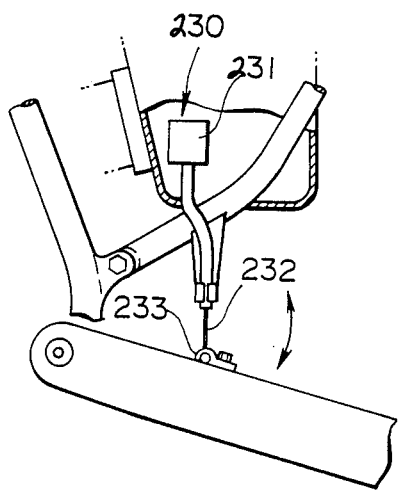
FIG. 23 shows a first device for detecting a jumping of a vehicle.

A jump control is performed on condition that the speed of the motorcycle is equal to or higher than a prescribed value in step (a-6), FIG. 21.

First, the control unit (U) judges whether or not the driving wheel is in contact with the ground, step (b-1). If the judgement is positive, the control proceeds to a lock-slip control (b-3). If the judgement is negative, the control proceeds to the following steps.

The control unit (U) detects the loss of contact of the driving wheel from the ground based on, for example, a jump signal from a jump sensor which sends a jump signal when the cushion unit 136 supporting the driving wheel is extended further than a prescribed level. That is, while the motorcycle is jumping, the cushion unit 136 is extended to nearly full length by loosing a reaction force from the ground. Therefore, if a sensor comprising a pair of electric terminals is disposed so that the terminals come in contact when the cushion unit 136 is fully extended, then a jumping signal is emitted by the sensor, while the motorcycle is jumping.

More precisely, an example of the mechanism to detect jumping is as follows. As shown if FIG. 22, a suspension switch 230 is provided in a suspension 212. The suspension switch 230 emits a jump signal when the suspension 212 is extended further than a prescribed level. The construction is shown in more detail in FIGS. 24 and 25.

Figure 24:
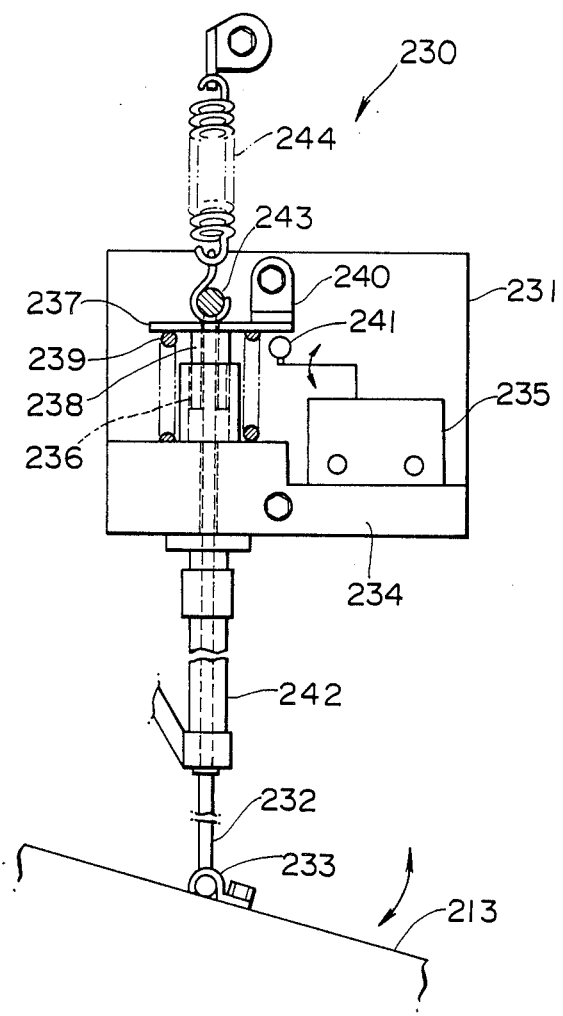
FIG. 24 shows a second device for detecting a jumping of a vehicle.

A switch box 231 is accommodated in an air cleaner 215. An end of a wire 232 is connected to a swing arm 213 by a fixation means 233. The fixation means 233 comprises a plate spring which moderates a shock when the swing arm 213 moves rapidly. As shown by FIG. 24, a base plate 234 is located in the switch box 231 on which a micro-switch 235 is attached. A guide tube 236 is also attached to the base plate 234 which receives a piston 238 received slidably along the guide tube 236. A coil spring 239 is located to surround the guide tube so that one end thereof is supported by the base plate 234 and the other end thereof is attached to an end plate 237. The end plate 237 is movable together with the coil spring 239 but the movement is restricted by a stopper member 240 which is connected to the switch box 231.

An operation arm 241 of the micro-switch 235 is located beneath the end plate 237 so that the micro-switch emits a signal when the operation arm 241 is pushed down by the end plate 237. The wire 232 which is connected to the swing arm 213 at its lower end extends upward passing through a guide tube 242, base plate 234, guide tube 236, coil spring 239, and end plate 237. An upper end of the wire 232 is connected to a bar member 243 which is suspended from above by a spring member 244 whereby a tensile force is acting on the wire 232 at any position of the swing arm 213. The bar member 243 pushes down the end plate 237 as the swing arm goes down with respect to the other members.

According to the above-mentioned construction, when the swing arm 213 is receiving a weight of the motorcycle, the swing arm 213 is at an upper position. Consequently, the end plate 237 is at an upper position keeping a distance between itself and the operation arm 241. Therefore, the micro-switch 235 does not emit a jump signal.

On the contrary, when the swing arm 213 becomes free from the weight, it goes down to a lower position. As a result, the wire 232 and the end plate 237 are pulled down. Consequently, the end plate 237 comes in contact with the arm 241 to have the micro-switch 235 emit a jump signal.

Therefore, a jump signal is emitted by the micro-switch 235 while the vehicle is jumping.

In a modified embodiment, the suspension switch is constructed as follows.

Figure 25A:
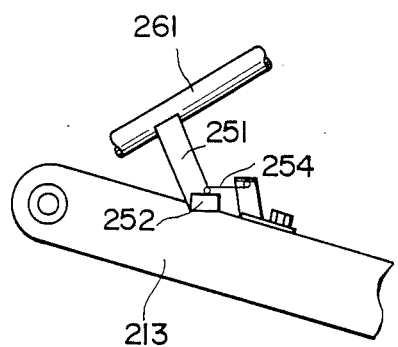
FIG. 25(A) and (B) show a switch mechanism to be used in a jump control.

As shown in FIGS. 25(A), a support lever 251 is connected to a frame 261. At distal end thereof, a micro-switch 252 is attached. An operation arm 254 is supported from the swing arm 213 to be out of contact with the micro-switch 252 while the swing-arm 213 is at an upper position. The operation arm comes in contact with the micro-switch 252 when the swing-arm 213 goes down. Thus, a jumping signal is emitted by the micro-switch while the motorcycle is jumping.

Figure 25B:
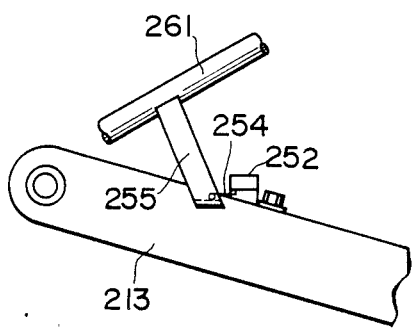

In a further modified embodiment shown in FIG. 25(B), a micro-switch 252 is attached to the swing arm 213 while an operation arm 254 and a support rod 255 supporting the operation arm 254 are supported from the main frame 261. According to the construction also, a jumping signal is emitted while the vehicle is jumping.

The control unit may be programmed to judge that the driving wheel is out of contact with the ground only when the jumping signal continues longer than a prescribed time interval in order to avoid falling into jumping control repeatedly when the vehicle is running on rough ground. This may increase a reliability of the judgement or an operability of the system because jumping signals which may be emitted erroneously while the motorcycle is passing over mounds and gaps do not continue long.

Subsequently, the control unit judges whether or not the jumping signal continues longer than a prescribed time interval, in step (b-21), FIG. 21. If the judgement is negative, the control proceeds to step (b-22). If the judgement is positive, the control proceeds to step (b-23).

At step (b-22), the transmission ratio is kept unchanged and the control returns to step (a-b 1).

At step (b-23), the control unit (U) calculates an objective transmission ratio R1 on the basis of the speed, the transmission ratio just before the jumping, and current rotational speed of the engine. Then, the control proceeds to step (b-24).

Subsequently, the control unit (U) judges whether or not the current transmission ratio (R) is practically identical to the objective transmission ratio (R1), in step (b-24). If the judgement is positive, the control unit (U) keeps the transmission ratio (R) uncharged and returns the control to the step (a-b 1), in step (b-25).

If the judgement is negative, the control proceeds to step (b-26) to increase or decrease the transmission ratio (R) so that the transmission ratio (R) becomes equal to the objective transmission ratio (R1). Then, the control returns to step (b-24).

By virtue of the above-mentioned jump control, jumping of the motorcycle is detected, and the transmission ratio is reset automatically while jumping so that the driving wheel recover a grip of the ground as soon as it touches the ground again. The re-adjustment of the transmission ratio is also effective in order to avoid an excessive rotation of the engine which may occur when the driving force recovers the grip of the ground after jumping. Change of rotational speed of the engine and speed of the motorcycle is taken into account therein. Further, while the motorcycle is running on an uneven ground, the drive wheel may repeat small jumps. But, the control does not proceed into step (b-23) while the duration of jumping does not exceed a prescribed time length. This operation is practical because such re-adjustments of transmission ratio are not necessary for such small jumps.

4.3.8 Lock-Slip Control (step b-3, b-4)

Figure 28:
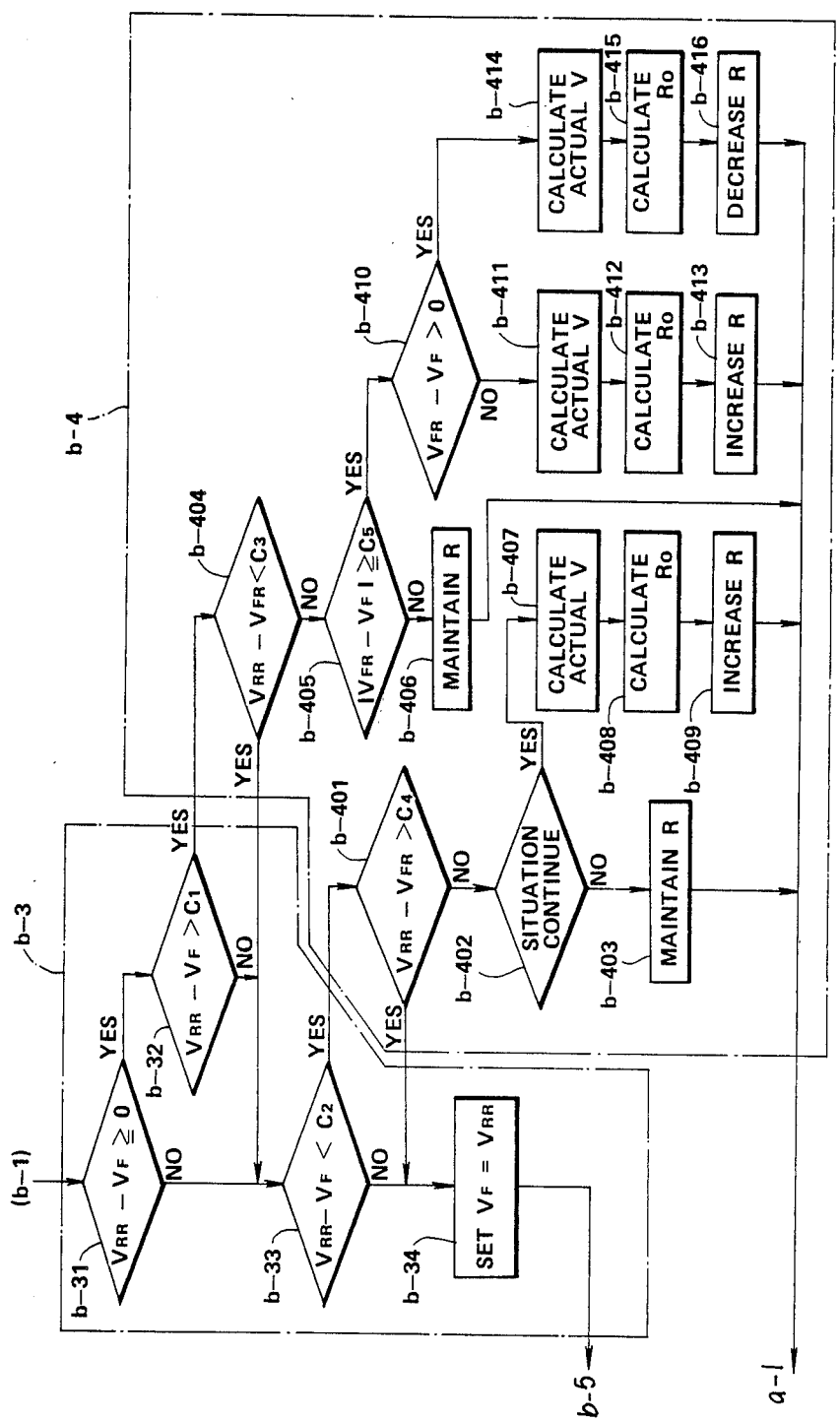
FIG. 28 is a flow chart showing a control procedure in lock-slip control.

A lock-slip control is performed on condition that the driving wheel is in contact with the ground at step (b-1), FIG. 28. In the lock-slip control, it is judged whether or not the driving wheel looses a grip of the ground by an excessive driving force or an excessive braking force, first step (b-3). Then, the transmission ratio is adjusted so that the driving wheel recovers the grip most quickly and smoothly on condition that the driving wheel has lost grip of the ground, in step (b-4). The above-mentioned steps (b-3) and (b-4) further comprise sub-steps explained as follows.

First, the control unit (U) calculates a difference of a former rotational speed VRR and a former rotational speed VF of the driving wheel and judges whether or not the difference Vrr−Vf is positive, or equal to zero, step (b-31).

If the difference VRR−VF is positive or equal to zero, then the difference VRR−VF is compared with a prescribed value (C1) which is normally a positive value, step (b-32). If the difference is larger than the prescribed value (if VRR−VF>C1), the control unit (U) judges that the driving wheel has lost a grip of the ground by an excessive acceleration force, and the control proceeds to step (b-404). If the difference is equal to or smaller than the prescribed value (if VRR−VF≦C1), then the control proceeds to step (b-33), in step (b-32).

In step (b-33), the difference VRR−VF is compared with a prescribed value (C2) which is normally a negative value. If the difference is lower than the prescribed value (if VRR−VF<C2), the control unit judges that the driving wheel has lost a grip of the ground by an excessive braking force, and the control proceeds to step (b-401). Otherwise, the control proceeds to step (b-34).

In step (b-34), the control unit keeps, the transmission ratio constant, replaces (VF) with (VRR), and the control proceeds to step (b-5).

As mentioned above,, according to the procedure of step (b-3), on such conditions, the control unit judges that the driving wheel keeps a grip of the ground on condition that an absolute value of temporal change of a rotational speed of the driving wheel is smaller than a prescribed value. Then, keeps the transmission unchanged, and proceeds to step (b-5).

On the contrary, procedures of step (b-4) are operated on a condition that the control unit has judged that the driving wheel had lost a grip of the ground by either an excessive braking force or an excessive driving force. In step (b-4), the transmission ratio is reset so that the driving wheel recovers the grip of the ground as soon as possible and smoothly, as follows.

In step (b-401) the control unit (U) calculates a difference of a rotational speed VRR of the driving wheel Wr and a rotational speed VFR of the non-driving wheel Wf, VRR−VFR, and compares it with a prescribed value C4 which is normally a negative value. If VRR−VFR is lower than C4, the control proceeds to step (b-402), in step (b-401). Otherwise, control returns to step (b-34). In other words, the control unit (U) judges that the driving wheel is not locked while a rotational speed thereof is not lower than that of the non-driving wheel by a prescribed value C4 even if a temporal change of a rotational speed of the driving wheel is lower than a prescribed value C2.

In step (b-402), the control unit judges whether or not VRR−VFR is lower than C4 for longer than a prescribed time interval. The control unit judges that the speed of the motorcycle has not changed much, and proceeds the control to step (b-403) on condition that the judgement is negative. If the control unit judges that the speed of the motorcycle has changed during the slip, and therefore requires a readjustment of the transmission ratio, it proceeds the control to step (b-407), in step (b-402).

In step (b-403), the control unit (U) retains the transmission ratio as it is and returns the control to step (a-b 1).

Step (b-407) is performed on condition that the duration wherein VRR−VFR >C4 is longer than a prescribed time interval in step (b-402). In the step, the control unit (U) calculates the present speed of the motorcycle, on the basis of the rotational speed (VFR) of the non-driving wheel.

Subsequently in step (b-408), the control unit (U) calculates an objective transmission ratio on the basis of the calculated speed of the motorcycle, so that, in general, the driving wheel recovers a grip of the ground most quickly. In general, the objective transmission ratio is a ratio by which a rotational speed of the driving wheel coincides with an actual speed of the vehicle.

In step (b-409) succeeding step (b-408), the control unit (U), sends a control signal to the transmission ratio varying mechanism so that the transmission ratio is altered to coincide with the objective transmission ratio. Generally, the transmission ratio is raised in this case because the driving wheel is slipping due to an excessive braking force and the speed of the motorcycle is being lowered from the speed before the occurrence of the slip. Then the control is returned to step (a-b 1).

The control enters in step (b-404) on condition that VRR−VF is larger than a prescribed value C1, that is, when a time derivative of rotational speed of the driving wheel exceeds the prescribed value. In the step, the control unit (U) calculates a difference of the rotational speed VRR of the driving wheel and the rotational speed VFR of the non-driving wheel, and compares the difference with a prescribed value C3 which is normally a positive value. If VRR−VFR is lower than C3, the control unit judges that the slip is not substantially large, and return the control to step (b-33). Otherwise, the control unit (U) judges that the driving wheel is slipping due to an excessive acceleration, requires a re-adjustment of the transmission ratio, and proceeds to step (b-405).

In step (b-405), the control unit (U) calculates a difference of the present rotational speed VFR of the non-driving wheel and a former rotational speed VF thereof, calculates an absolute value of the difference, and compares the absolute minimum value with a prescribed value C5. If the absolute value is smaller than C5, the control unit judges that a temporal change of the speed of the motorcycle is not substantially large, re-adjustment of the transmission ratio unnecessary, and proceeds to step (b-406). If the absolute value is equal to or larger than C5, the control unit (U) judges that the speed of the motorcycle has changed over a certain level while the driving wheel is slipping, and proceeds to step (b-410) for re-adjustment of the transmission ratio.

In step (b-406), the transmission ratio is retained as it is and the control is returned to step (a-1).

In step (b-410), the control unit (U) judges whether or not the difference VFR−VF is positive or not. If the difference is positive, the control unit (U) judges that the motorcycle is being accelerated and slipping the driving wheel by an excessive driving force and proceeds to step (b-414). If the difference is negative, the control unit (U) judges that the motorcycle is losing its speed while the driving wheel is slipping, and proceeds to step (b-411). This case occurs when the motorcycle comes to a muddy ground and the speed of the motorcycle drops quickly while the driving wheel is spinning in the mud, for example.

In step (b-411), the control unit (U) calculates an actual speed of the motorcycle on the basis of the rotational speed of the non-driving wheel, and proceeds to step (b-412).

Subsequently, the control unit calculates an objective transmission ratio on the basis of the calculated speed of the motorcycle. The objective transmission ratio is determined, for example, so that the rotational speed of the driving wheel corresponds to the actual speed of the motorcycle, in step (b-412).

Then, in step (b-413), the control unit (U) send a control signal to the transmission ratio varying mechanism so that the transmission ratio coincides with the objective transmission ratio. In this case, generally, the transmission ratio is raised because the speed of the motorcycle is decreasing and the rotational speed of the driving wheel is too high compared to the actual speed of the motorcycle. Subsequently, the control is returned to step (a-1).

Step (b-414) starts on condition that the rotational speed of the non-driving wheel is increasing with respect to time. The control unit (U) estimates the actual speed of the motorcycle on the basis of the rotational speed of the non-driving wheel.

Subsequently, the control unit (U) calculates an objective transmission ratio on the basis of the calculated actual speed of the motorcycle, in step (b-415). Generally, the objective transmission ratio is determined so that the driving wheel recovers a grip of the ground most quickly and smoothly.

In step (b-416) succeeding to step (b-415), the control unit (U) send a control signal to the transmission ratio varying mechanism to have it adjust the transmission ratio to coincide with the objective transmission ratio.

Effects of the above-mentioned lock-slip control will be explained, hereinafter, referring to an operation in a motorcycle passing through a muddy ground.

When a motorcycle is passing over small obstacles and dips and the rotational speed of the driving speed with respect to time is not varying over a certain value, the transmission ratio is kept unchanged as long as the lock-slip control is concerned (steps b-3, b-403).

When a motorcycle arrives at a muddy area in the ground and the driving wheel starts spinning thereon, rotational speed of the engine and of the driving wheel jumps up abruptly as the driving wheel looses a grip of the ground. It occurs because the maximum friction force is smaller on a muddy ground compared with a normal or firm ground. At a same time, speed of the motorcycle and rotational speed of the non-driving wheel begin to decrease. In such a case, it is important to give the driving wheel a moderate driving force because an excessively high driving force increases the spin inadvertently and an insufficient driving force does not push the motorcycle out of the mud. According to the lock-slip control, the control unit finds that the driving wheel has lost a grip of the ground on the basis that the rotational speed of the driving wheel jumps up abruptly (steps b-31, b-32), and finds that an excessive driving force is being transmitted to the driving wheel (step b-404). Then, if the speed of the motorcycle is not lowered much yet (step b-405), the transmission rate is kept as it has been so as to give the driving wheel a driving force suitable to get out of the muddy place (step b-406). If the speed of the motorcycle has already dropped more than a certain level, transmission ratio is increased so that the driving wheel recaptures a grip of the ground and enough driving force is transmitted to the driving wheel (steps b-411 to b-413).

When an excessive braking force is exerted to the driving wheel and the driving wheel looses a grip of the ground, the control unit detects the situation on the basis that a rotational speed of the driving wheel drops abruptly (step b-33) and rotational speed of the driving wheel is lower than that of the non-driving wheel (step b-401). If the situation continues longer than a prescribed time interval (step b-402), the transmission ratio is reset so that an excessive driving force or braking force may not be exerted to the driving wheel when it recaptures a grip of the ground. The engine is protected from an excessive forced rotation which may be caused by a transmission of excessive whirling force from the driving wheel when it recaptures a grip of the ground.

When an excessive driving force is transmitted to the driving wheel and the motorcycle is accelerating as the driving wheel is half slipping, transmission has to be adjusted so that the slip is minimized and a maximum driving force is transmitted to the ground. In such a case, slip of the driving wheel as the motorcycle is accelerating is detected by the control unit on the basis that the rotational speed of the driving wheel is increasing (step b-31) and larger than that of the non-driving wheel (step b-32), and rotational speed of the non-driving wheel is increasing (step b-405, 410). Then, a suitable transmission ratio is calculated on the basis of the rotational speed of the non-driving wheel and the transmission ratio is reset so as to recover a grip as soon as possible or to minimize a shock when a grip is recovered.

Because the above-mentioned lock-slip control is performed according to the jump control, mismatching of the rotational speed of the driving wheel with that of the non-driving wheel during a jump is treated correctly by the jump control procedure. Thus an operability of the system is increased.

In a modified embodiment, a series of controls according to a situation wherein a vehicle is accelerating while the driving wheel is spinning may be constituted as follows.

Figure 27A:
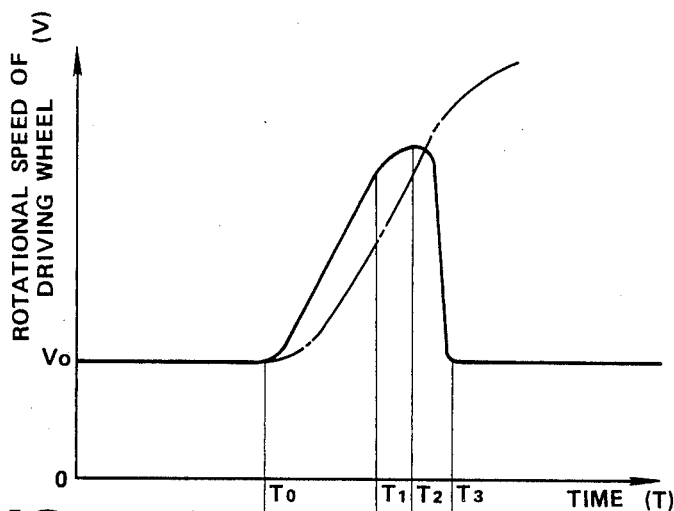
FIG. 27(A) and 27(B) show rotational speed and acceleration of a driving wheel in terms of time.
Figure 27B:
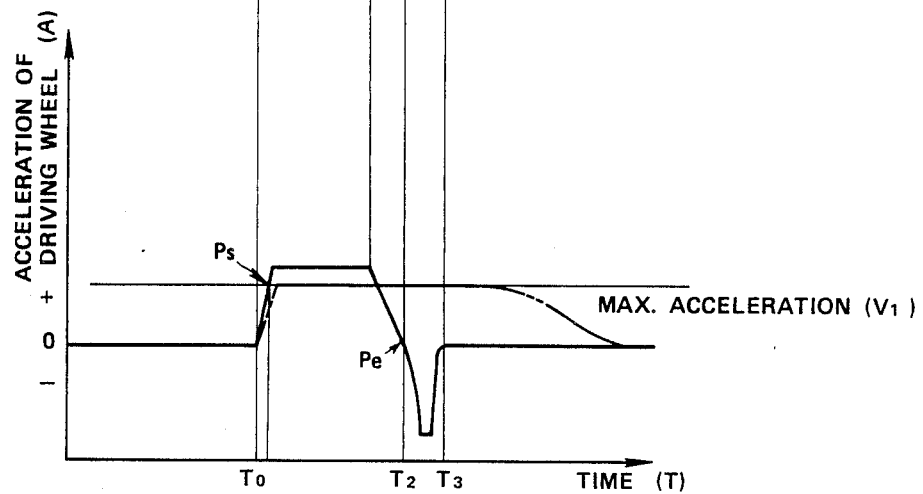

As shown in FIG. 27(B), the control unit stores a maximum positive acceleration A1 which is a maximum possible acceleration realized by the vehicle. The acceleration A1 corresponds to a situation wherein a maximum driving force is acting between the driving wheel and the ground, that is, friction force acting is equal to a maximum static friction force of the wheel. Therefore, it becomes possible to detect a spin of the driving wheel by comparing an apparent acceleration (A), calculated from a temporal change of the rotational speed of the driving wheel, with the maximum acceleration (A1). The apparent acceleration (A) is calculated by using a rotational speed (V) of the driving wheel as follows.

$$A = (Vn - Vm)/(Tn - Tm)$$

wherein
Vn: current rotational speed of driving wheel
Vm: former rotational speed of driving wheel
Tn: time corresponding to Vn
Tm: time corresponding to Vm In general, time interval between Tn and Tm, that is (Tn−Tm), is kept constant for a simplicity of an operation. The idea of the judgement is explained more in detail referring to FIGS. 27(A) and 27(B).

FIG. 27(A) shows a rotational speed of a driving wheel in terms of time. The solid line shows a temporal change of a rotational speed of the driving wheel, for example. The actual driving condition of the vehicle is as follows. The vehicle first runs at a constant speed until time T0, starts accelerating at time T0 while slipping the driving wheel due to an excessive driving force transmitted to the driving wheel, gradually reduces acceleration at time T1 until time T2, is braked between T2 and T3, and runs at a constant speed from time T3.

Corresponding temporal change of the apparent acceleration (A) is shown by FIG. 27(B). The apparent acceleration is zero until time T0, increases rapidly to a constant positive level after T0, keeps a constant positive level until T1, begins to drop rapidly at time T1, decreases until it comes to a negative constant level, increase to zero, and is maintained at zero from time T3, shown by a solid line.

On the other hand, the dotted line in FIG. 27(A) shows a maximum speed change of the vehicle calculated theoretically supposing that the vehicle starts accelerating at its maximum possible acceleration, keeping a grip of the ground, at time T0. Between T0 and T1, the rotational speed of the driving wheel increases more rapidly than a calculated maximum value which indicates that the driving wheel is spinning and the rotational speed thereof does not represent a correct speed of the vehicle. While in FIG. 27(B), the dotted line parallel to the zero line shows a theoretically obtained maximum possible acceleration of the vehicle. The apparent acceleration calculated from the rotational speed of the driving wheel becomes higher than the theoretical maximum level in a certain time interval between T0 and T2. It is detected, by comparing the above-mentioned solid line and dotted line, that the driving wheel is slipping. Further, detection of slipping is simpler when based on the acceleration than on the speed because a simple comparison of apparent acceleration with, a prescribed maximum value gives the judgement. In the above case, occurrence of slip is detected at time Ps at which the apparent acceleration exceeds the theoretical maximum value, and termination of the slip is detected at time T2 at which the acceleration becomes negative.

Figure 26:
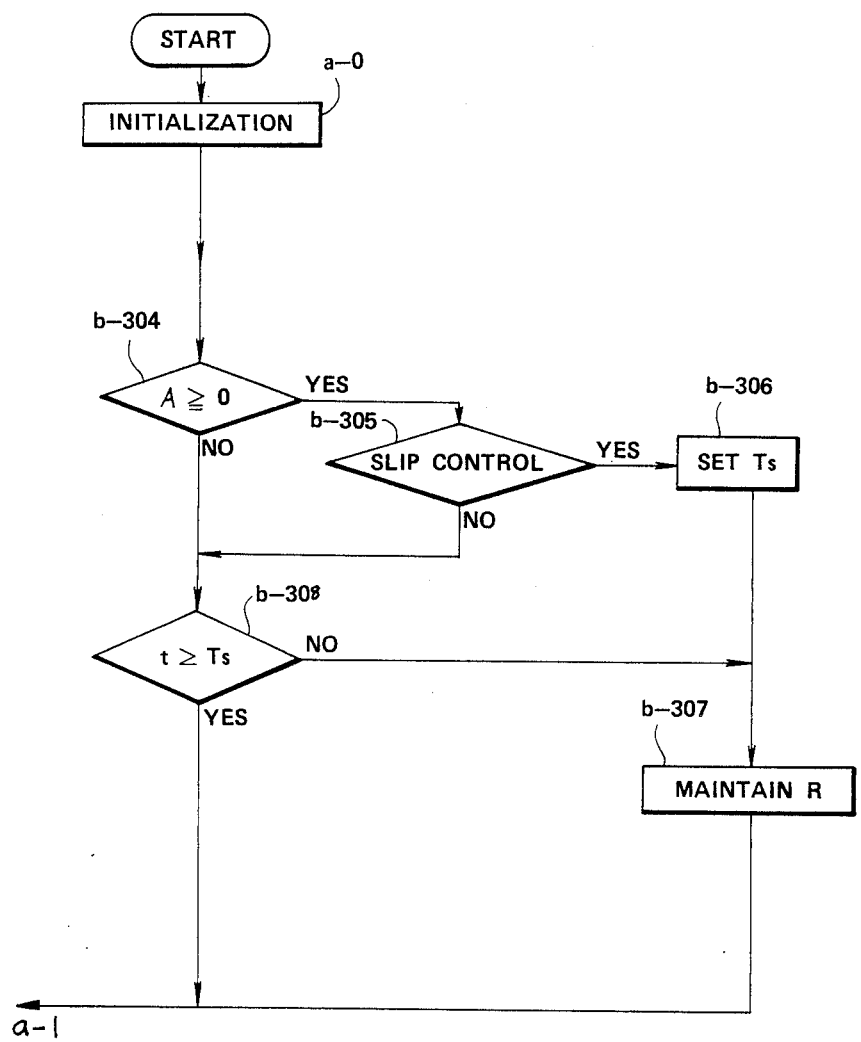
FIG. 26 is a flow chart showing a modified procedure for acceleration slip control.

At step (b-304) in FIG. 26, the control unit judges whether or not the vehicle is accelerating on the basis of an apparent acceleration. If the vehicle is accelerating or running at a constant speed, the control proceeds to step (b-305). Otherwise, the control proceeds to step (b-308).

At step (b-305), the control unit judges whether or not the vehicle requires a slip control. More precisely, the apparent acceleration (A) is compared with a maximum or threshold value (A1), and if A is equal to or larger, than (A1) it is judged that the slip control is needed. Otherwise, it is judged that the slip control is not needed. The control proceeds to step (b-306) in the former case and proceeds to step (b-308) in the latter case.

At step (b-306), the control unit sets a control flag positive and determines a control time interval Ts based on various variables such as the duration of the slip, the speed of the vehicle before slip, etc. The control flag is used to judge whether or not the control is in the slip control and Ts is used to indicate whether or not to get out of the slip control in the following procedures.

Succeeding to step (b-306), the control unit send a signal to the transmission ratio varying mechanism to hold the transmission ratio as it was before slip, and proceeds to step (a-1) in step (b-307). Thus the transmission ratio is protected from being altered to a lower ratio due to an increase of the engine speed.

At step (b-308), the control unit examines whether or not the control flag is on. If the flag is off, the control jumps out of the slip control. If the flag is on, the control unit judges whether or not the situation wherein the acceleration is negative continues longer than the prescribed time interval Ts. If the duration is not longer than Ts, the control proceeds to step (b-307) to further continue the slip control. Otherwise, the control unit judges that the situation gets out of the slip control, sets the operation flag negative and returns to step (a-1).

According to the above-mentioned control procedure, slip of the driving wheel while the driving force is transmitted to the driving wheel, which is called acceleration slip hereinafter, is detected by the control unit and the transmission ratio is kept unchanged so as to avoid further slip of the driving wheel. The control unit judges that the acceleration slip continues while the apparent acceleration calculated from a rotational speed of the driving wheel is positive and keeps the transmission ratio at the initial ratio. When the apparent acceleration becomes negative, the control gets out of the slip control.

In a further modified slip control, the control unit store the apparent speed of the vehicle when it exceeds the maximum possible speed (initial speed) judging naturally that the driving wheel starts spinning. Then, the control unit judges that the driving wheel has recovered a grip of the ground when the apparent speed becomes equal to the initial speed again.

4.3.9 Inertial Running Control

Figure 29:
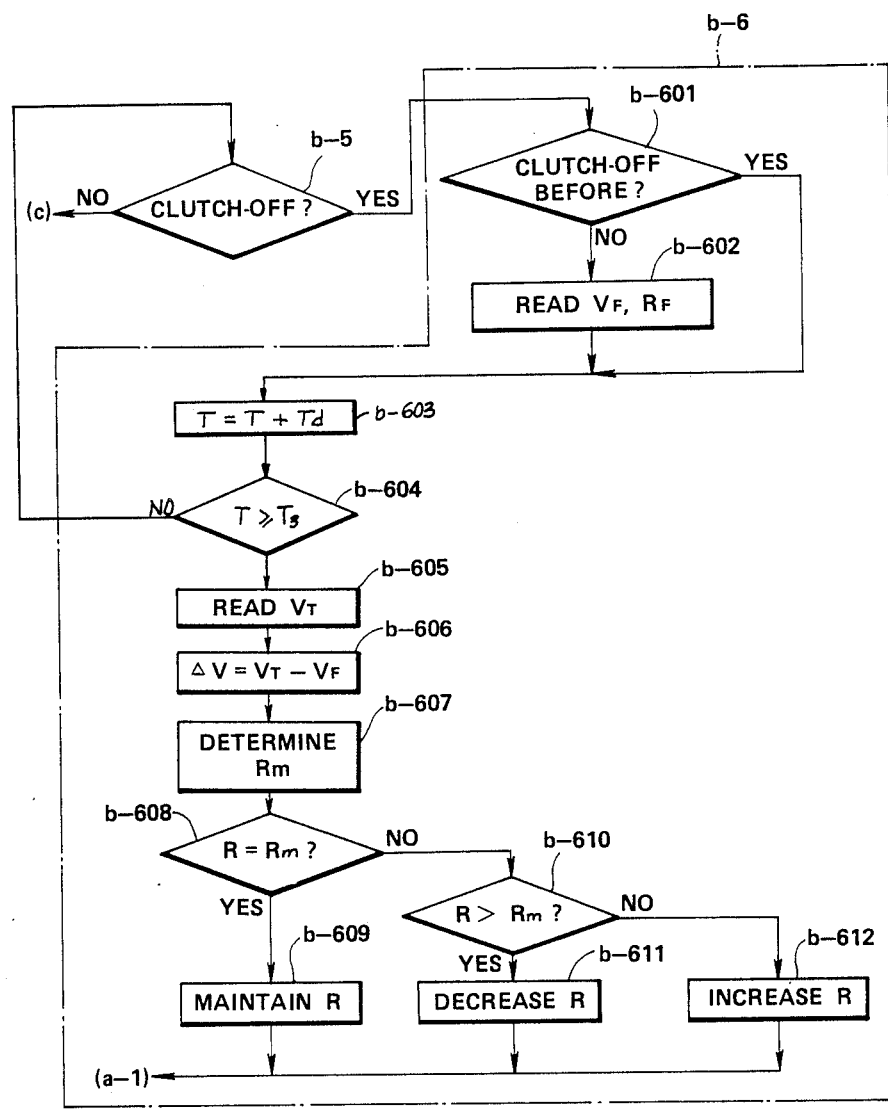
FIG. 29 is a flow chart showing a control procedure at an inertial running control.

Inertial running control (b-5, b-6) starts on condition that the rotational speed of the driving wheel does not change over a certain level, in FIG. 29. While running down a slope, for example, the driving wheel may be clutched off the engine so as to avoid an inadvertent acceleration or engine braking. In this case, transmission ratio has to be adjusted while the clutch is off so that a shock may not occur when the clutch is connected again. Transmission ratio is controlled in such a case according to the inertial running control as follows.

At the beginning, the control unit (U) examines whether or not the clutch is on, step (b-5). If the clutch is on, the control unit (U) judges that the situation is not to be treated by the inertial running control and proceeds to step (c). If the clutch is off, the control proceeds to step (b-601).

In step (b-601), the control unit examines whether or not the clutch has been off from before. If the clutch has been on, if the clutch is put off from now on in other words, control proceeds to step (b-602). Otherwise, control proceeds to step (b-603).

In step (b-602), the control unit (U) reads and stores the speed (VF) of the motorcycle and the transmission ratio (RF). Then, control proceeds to step (b-603).

In step (b-603), the control unit renew the time span (T) by adding an elapsed time increment Td from a former operation of the step to the present operation to the former (T).

In step (b-604), if the time span wherein the clutch is set off is longer than a prescribed time length Ts, control proceeds to step (b-605). Otherwise, control returns to step (b-5).

In step (b-605), control unit reads the current speed VT of the motorcycle from a first speed sensor measuring a rotational speed of the non-driving wheel.

Subsequently, the control unit calculates a difference of current speed VT, and the speed VF corresponding to the moment at which the clutch was set off, $VT - VF = \Delta V$, and proceeds to the next step (b-607), in step (b-606).

Next, in step (b-607), objective transmission ratio Rm is obtained by virtue of a preset relation, between Rm, duration of clutch, off Td, differential speed $\Delta V$ calculated in step (b-606), and transmission ratio RF at a moment of clutch off. Control then proceeds to step (b-608).

In step (b-608), the control unit compares current transmission ratio (R) with the objective transmission ratio (RM). If they coincide, the control unit keeps the transmission ratio as it is, in step (b-609), and return the control to step (a-1). If they do not coincide, the control proceeds to step (b-610).

In step (b-610), the control unit judges whether or not the current transmission ratio (R) is larger than the objective transmission ratio (RM). Then, the control proceeds to step (b-611) for decreasing the transmission ratio in case (R) is larger than (RM). Otherwise, the control proceeds to step (b-612) for increasing the transmission ratio. In both the above cases, control returns to step (a-1) after the transmission ratio is adjusted to the objective ratio.

Throughout the above-mentioned procedure, the transmission ratio is reset continuously while the clutch is set off to such a ratio that the rotational speed of the driving wheel will coincide with the current speed of the motorcycle if the clutch is set on at any moment. More practically, operation in the above-mentioned inertial running control is explained with reference to a specific case, as follows.

Suppose that the clutch is put off as the motorcycle is approaching a corner at a high speed, and the motorcycle is slowed down before the corner by braking, and the clutch is set on at the exit of the corner for re-accelerating the motorcycle. Simultaneously, transmission ratio is set so that the rotational speed of the driving wheel will coincide with the current speed of the motorcycle at any time. Therefore, the transmission ratio is kept at a low ratio almost constantly while the motorcycle is approaching the corner at a high speed. Then, the transmission ratio is raised gradually as the speed of the motorcycle decreases by the braking, so the driving force is transmitted smoothly to the ground when the clutch is set on again at the exit of the corner.

In case the motorcycle is running down a slope as the clutch is set off, the speed of the motorcycle increases while the clutch is set off. In this case also, the transmission ratio is reset continuously so that the rotational speed of the driving wheel will coincide with the current speed of the motorcycle. Therefore, the driving wheel obtains again a driving grip of the ground immediately when the clutch is set on again.

Thus, the inertial running control contributes to minimize a shock when the clutch is set on again after, having been set off. Consequently, the motorcycle recovers a driving grip of the ground immediately and is accelerated quickly when the clutch is set on again.

If the clutch is set off while jumping, what is important is that the driving wheel recovers a driving grip of the ground as soon as it comes in contact with ground again, which is an object of the jump control. Because the jump control and the lock-slip control are performed prior to the inertial running control, the transmission ratio is adjusted properly even if the clutch is set off while jumping or lock-slipping according to the former controls.

4.3.10 Normal Control

Figure 30:
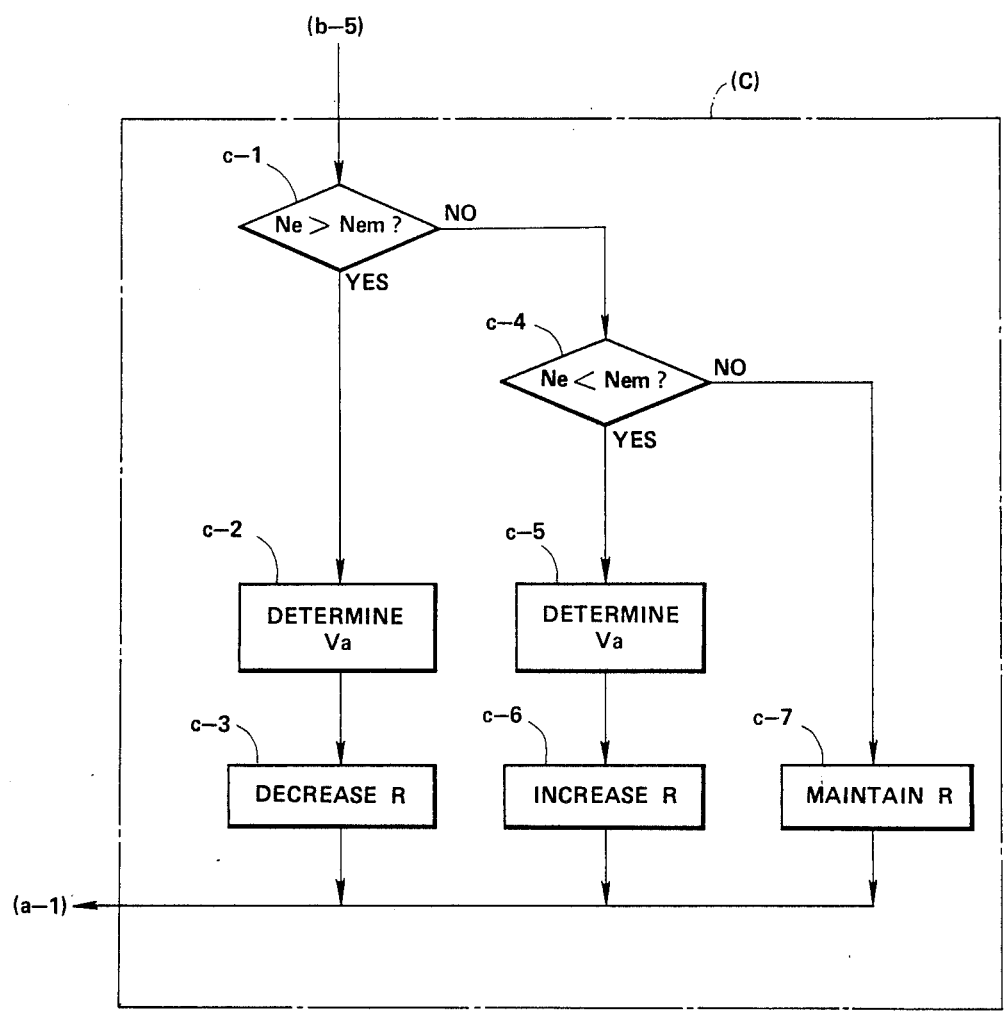
FIG. 30 is a flow chart showing a control procedure at a normal stage control.

FIG. 30 shows a procedure of the normal control (c) which is performed on condition that the clutch is on at step (b-5). Operation in the normal control is explained in detail hereinafter.

Figure 31:
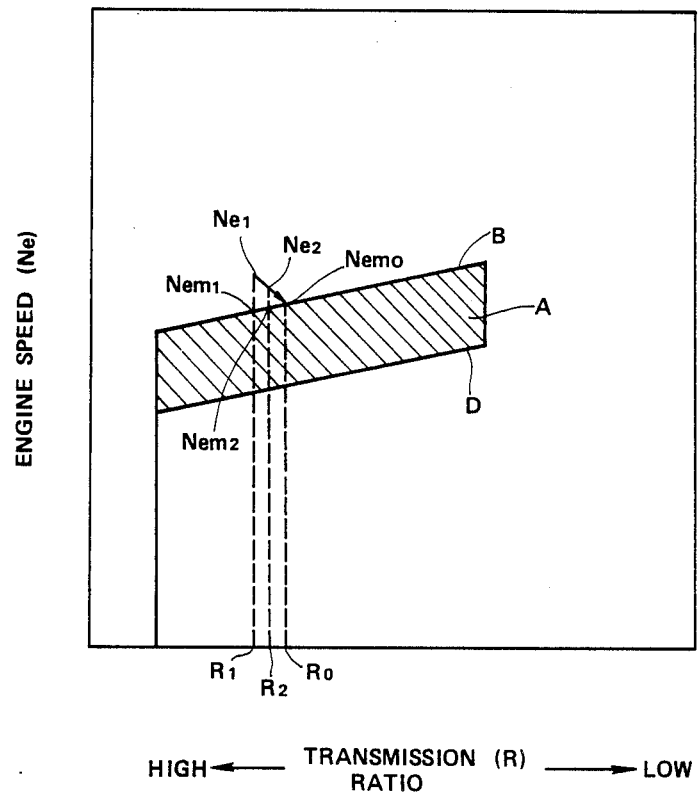
FIG. 31 shows a relation between the rotational speed of the engine and the transmission ratio.

First, in step (c-1), an objective rotational speed (Nem) of the engine is determined by virtue of a preset relation as regards a rotational speed of the engine and a transmission ratio as shown in FIG. 31. When referring to the preset relation, rotational speed of the engine (Ne), throttle aperture (Ap), speed of the motorcycle (V), and transmission ratio (R) which are read and stored in step (a-1) are utilized. FIG. 31 shows schematically a relation of suitable combination of rotational speed of the engine (Ne) and transmission ratio (R). As shown in FIG. 31, a range of suitable rotational speeds (Ne) correspond to transmission ratios. The range shifts towards higher rotational speed as the transmission ratio decreases so as to secure a desirable engine torque. In the figure, the hatched area (A) denotes a range of suitable engine rotational speeds corresponding to respective transmission ratios.

The control unit determines an objective rotational speed range (Nem) of the engine by virtue of the above-mentioned relation, then, compares (Nem) with an actual rotational speed (Ne) of the engine. If (Ne) is out of the range of (Nem) and higher than (Nem), that is, if the transmission ratio (R) is smaller as regards the current engine speed (Ne), control proceeds to step (c-2). Otherwise, the control proceeds to step (c-4).

In step (c-2), the control unit first calculates the angle at which the rotatable motor plate holder 20 is held, then, determines an angular speed Va by which the tilt angle of the rotatable motor plate holder 20 is altered, by virtue of a predetermined relation thereof. The control unit sends a control signal regarding the angular speed Va to the transmission ratio varying mechanism for the adjustment.

Subsequently in step (c-3), the transmission ratio varying mechanism alters the tilt angle of the motor plate holder according to the control signal from the control unit. By this operation, transmission ratio decreases so as to increase the speed of the motorcycle and to decrease the engine speed. The control then returns to step (a-1).

In step (c-4), the control unit judges whether or not the actual engine speed (Ne) falls within the objective engine speed range (Nem). If the judgement is positive, the control unit (U) maintains the transmission ratio and returns the control to step (a-1), in step (c-7).

If the current engine speed is lower than the objective engine speed range, that is, if the transmission ratio is lower than a suitable value, the control unit calculates the tilt angle at which the motor plate holder is retained, and determines an angular speed Va at which the tilt angle of the holder is altered. Then the control unit sends a signal to the transmission ratio varying mechanism so as to have it change the tilting angle of the motor plate holder according to the signal, in step (c-5).

Subsequently, the transmission ratio varying mechanism alters the tilting angle of the motor plate holder so that the transmission ratio is increased, in step (c-6). By this operation, transmission ratio is adjusted correctly when the transmission ratio is set too small compared to the speed of the engine. Then, the control returns to step (a-1).

By virtue of the above-mentioned normal control, transmission ratio is altered repeatedly until the combination of the engine speed and the transmission ratio falls in a suitable value wherein a desirable acceleration, engine braking or constant running is secured.

Control procedure in the normal control is explained more precisely with referring to FIG. 31.

Suppose that a combination of engine speed and transmission ratio falls in the point (Ne1) at the beginning.

The control unit judges that the current engine speed (Ne1) is higher than a suitable range defined as a function, of a transmission ratio (R1). Then, the control unit (U) sends a control signal to the transmission ratio varying mechanism to lower the transmission ratio. In accordance with the decrease of the transmission ratio, engine speed decreases also due to the load to engine increasing in consequence. As a result, transmission ratio decreases to (R2) and engine speed decreases to (Ne2).

At this stage again, the control unit (U) reads the current transmission ratio (R2) and the engine speed (Ne2), judges that the engine speed (Ne2) is still higher than a range of engine speeds suitable for the current transmission ratio (R2), and sends a control signal to the transmission ratio varying mechanism for again decreasing the transmission ratio. As a result, the transmission ratio is lowered and the engine speed decreases.

The procedure is repeated until the engine speed falls within a range suitable with respect to a transmission ratio.

Finally, as shown in FIG. 31, engine speed becomes (Nem0) which is in the range of engine speeds suitable for the corresponding transmission ratio (R0), and the step of normal control terminates for the time being. As explained above, engine speed and transmission ratio arrive at respective suitable values as a result of an iteration. In other words, the control unit does not estimate the final transmission ratio by which both the transmission ratio and the engine speed fall in a suitable combination but determines only whether the transmission ratio is increased or decreased. This procedure much simplifies the control procedure because the estimation of the final transmission ratio beforehand is elaborate and unreliable as the engine speed varies in accordance with the transmission ratio.

Further, because a suitable range of engine speed is determined for a transmission ratio, the control becomes quicker and simpler compared to a control wherein a suitable engine speed, not a range, is determined for a transmission ratio. In the latter case, iteration numbers and time for iteration increases.

When the engine speed is lower than the suitable engine speed range for a transmission ratio at an initial stage, on the contrary, the control proceeds as follows.

The control unit (U) finds that the engine speed is too low for the transmission ratio, sends a control signal to the transmission ratio varying mechanism to increase the transmission ratio, and repeats the above steps until the engine speed falls in a suitable engine speed range for the corresponding transmission ratio. At this time, the engine speed approaches the suitable engine speed range from lower engine speeds, and the control unit judges that the combination of engine speed and transmission ratio is suitable when the engine speed arrive within the range. Therefore, even if the final transmission ratio is the same, corresponding engine speeds differ as regards to whether the engine speed was higher or lower than the suitable range. Thus the procedure contributes to simplify and accelerate the control.

Figure 32:
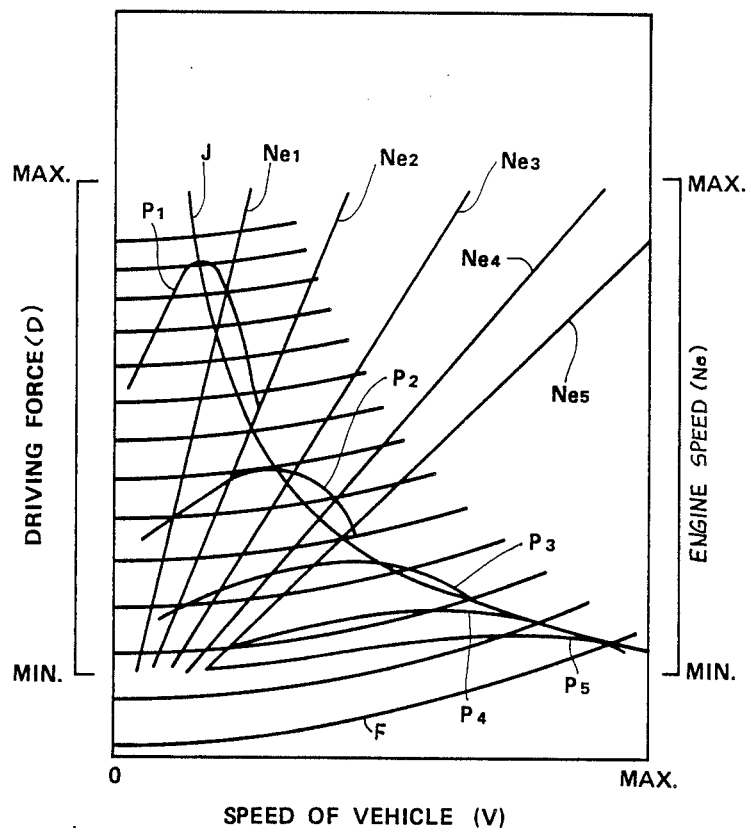
FIG. 32 shows a relation between the driving force and the speed of the vehicle.

FIG. 32 shows a relation between a driving force (D), speed of the motorcycle (V), and engine speed (Ne). Straight lines Ne1 to Ne5 show a relation between the engine speed (Ne) shown along the right scale on the abscissa and the speed of the motorcycle (V) shown along the ordinate for different respective transmission ratios R1 to R5, transmission ratio decreasing from R1 to R5. In the figure, engine speeds (Ne) are for ratios five different ratios R1 to R5, for a simplicity of explanation, though the transmission is a stepless type. R1 corresponds to a conventional low gear ratio wherein highest engine speed among the five is required to obtain a same speed of the motorcycle. R5 corresponds to a conventional top gear ratio wherein a lowest driving force is obtained at the same engine speed, generally. For a fixed transmission ratio, the relation between the engine speed (Ne) and the speed of the motorcycle is linear.

Curved lines P1 to P5 show a relation between the driving force (D) shown along the left scale on the abscissa and the speed of the motorcycle (V) shown along the ordinate, for the different transmission ratios R1 to R5. The curves are generally convex towards the upper side. Therefore, given a transmission ratio R1 for example, a motorcycle has a maximum driving force at a certain speed which corresponds the summit on the curve P1. Corresponding engine speed (Ne) is obtained as follows. Given the curve P1, draw a straight line downwards parallel to the abscissa from the summit and find an intersection of the straight line and the straight line (Ne1). Then, draw a straight line from the intersection horizontally to the right until the horizontal line intersects the right abscissa. The intersection on the right abscissa gives an engine speed which gives a maximum driving force at the transmission ratio R1. Engine speeds giving maximum driving force at different transmission ratios are obtained in the same manner. Naturally, thus obtained engine speeds are identical to each other as far as the effect of the resistance is neglected.

The lines (F) represent resistance exerted to the motorcycle which is a function of the speed of the motorcycle and a grade of the road, as conventionally shown in this kind of graph.

The curve (J), which is obtained by tieing the summits of the curves P1 to P5, shows maximum possible driving forces for different speeds of the motorcycle. Because the transmission is a stepless type and an infinite number of such curves exist actually, the curve (J) is a continuous curve which gives a transmission ratio for obtaining a maximum driving force when a speed of the motorcycle is determined. The engine speed which gives a maximum driving force is called a suitable engine speed hereinafter for simplicity. In order to make maximum use of the engine power, the transmission ratio has to be controlled so that a combination of driving force and speed of the motorcycle falls on the line (J).

As shown in FIG. 32, while the speed (V) of the motorcycle is low, transmission ratio has to be altered more than while the speed is high in order to keep the engine speed suitable. That is, the gradient of the curve (J) is relatively steep for lower speeds (V) than for higher speeds (V). Therefore, in the present invention, alteration speed of the tilt angle of the inclined plate holder is controlled so that the speed is high when speed of the motorcycle is low, the alteration speed is low when the speed of the motorcycle is high, whereby the actual state of the motorcycle falls on the curve (J). Thus, a rapid enough acceleration occurs in a low speed range and a hunting of the engine is avoided in a high speed range.

Alteration speed of the tilt angle (Va) of the inclined plate holder is as follows.

Figure 33:
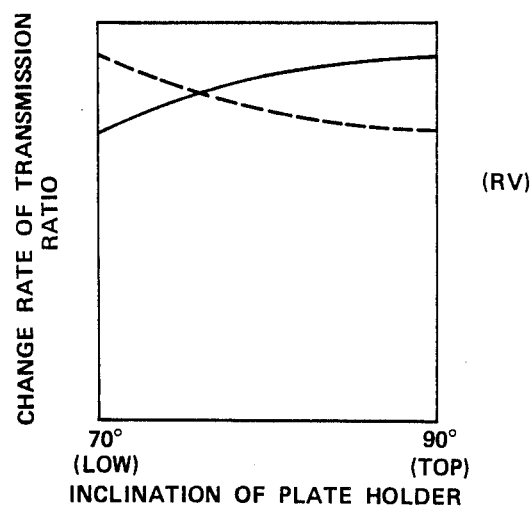
FIG. 33 shows a relation between a speed of changing transmission ratio versus a tilt angle of the motor plate holder.

A relation between the alteration speed of the transmission ratio (Vat) for different tilt angles of the inclined plate holder is shown in FIG. 33. The solid line shows the relation when the alteration speed Va of the angle is kept constant. In this case, because the transmission ratio is proportional to the volume of the motor cylinders, the transmission ratio alteration speed is proportional to a sinusoidal function of the tilt angle. But, from a practical point of view, the transmission ratio had better be altered rapidly when the transmission ratio is large, and slowly when the ratio is small. This is because the driving condition of the vehicle is sensitive to the transmission ratio when the ratio is small, and dull when the ratio is high. Therefore, the control unit controls the alteration speed of the inclined plate holder so that the alteration speed of the transmission ratio is shown by the dotted line in FIG. 33.

Figure 34:
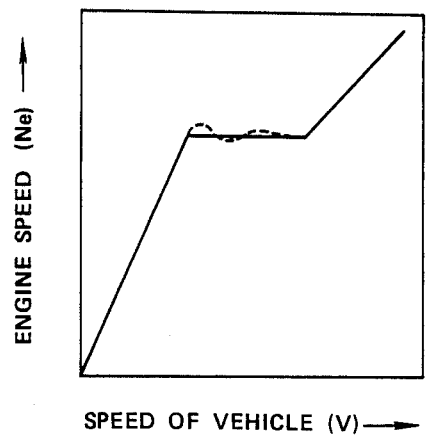
FIG. 34 shows a relation of engine speed to vehicle speed.

A problem when the alteration speed of the inclined plate holder is constant is, for example, that the engine speed fluctuates as shown in FIG. 34 when the throttle is kept constant while the transmission ratio is low. This is because the alteration speed is excessively high in that range of transmission ratio, so an over shooting in adjusting the transmission ratio occurs which results in a fluctuation of the engine speed. The problem is avoided by virtue of the above-mentioned regulation of the alteration speed.

4.3.11 Braking by Automatic Transmission

In a modified embodiment of the present invention, further control is performed within the normal control prior to the above-mentioned controls. The added part of the control is performed so that a rotational movement of the hydraulic motor is restricted by a valve operation resulting in an exertion of braking force to the motorcycle. Control of the transmission in the above-mentioned braking control is explained as follows.

Figure 35:
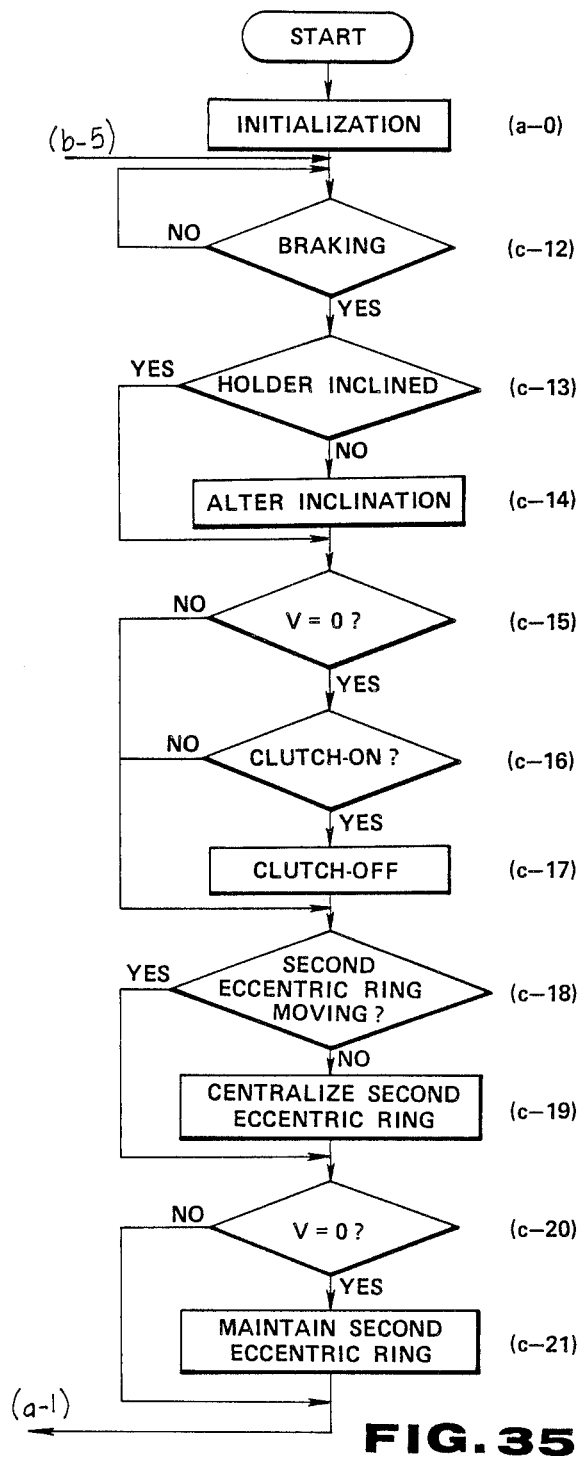
FIG. 35 is a flow chart showing a modified control procedure in a normal control.

Control according to this step is explained as follow (see FIG. 35).

The control enters in the current step on condition that the clutch is on at the step (b-5) in FIG. 29.

Step (c-12): The control unit judges whether or not the brake mechanism is being operated. If the judgement is positive control proceeds to step (c-13). Otherwise, the control remains at step (c-12).

Step (c-13): The control unit reads tilt angle of the motor plate holder, and proceeds to step (c-14) if the angle is zero, that is, if the motor plate holder is in a plane perpendicular to the axis of the main shaft 25. If the tilt angle is not zero, the control proceeds to step (c-15).

Step (c-14): The control unit sends an operation signal to the transmission ratio varying system and makes it alter the tilt angle. Then goes to step (c-15).

Step (c-15): The control unit judges whether or not the speed of the motorcycle is zero. If the speed is zero, the control proceeds to step (c-16). Otherwise, the control proceeds to step (c-18).

Step (c-16): The control unit judges whether or not the clutch is connected. If the clutch is connected, the control proceeds to step (c-17). Otherwise, the control jumps to step (c-18).

Step (c-18): The control unit judges whether or not the second eccentric ring is being shifted towards a co-axial position with the main shaft. If the judgement is positive, the control jumps to step (c-20). Otherwise, the control proceeds to step (c-19).

Step (c-19): The control unit sends a signal to the transmission ratio varying mechanism to shift the second eccentric ring towards the, co-axial position.

Step (c-20) and step (c-21): The control unit judges whether or not the speed of the motorcycle is null. If the speed is null, the control unit keeps the position of the second eccentric ring at the current position, and return the control to step (a-1). Otherwise, it returns the control to step (a-1).

According to the above-mentioned control, hydraulic flow from and into the motor cylinders is stopped when the second eccentric ring is co-axially positioned. Therefore, the motor plungers are fixed in position, the axial position of each plunger being different to each other, and a braking force is exerted to the driving wheel due to an incompatibility of the motor plungers and the inclined motor plate holder. Thus the rotation of the main shaft is restricted.

In the above-mentioned embodiment, braking force due to the transmission is exerted while the clutch is off. But this is not necessarily so, and the braking force can be exerted while the clutch is on. In the latter case, engine brake is utilized together with the braking force due to the transmission. But in this case, the clutch had better be set off before the motorcycle comes to a complete stop, or the engine will be stopped as it is directly connected to the main shaft and the driving wheel. The above-mentioned brake due to transmission can replace ordinary brake systems but naturally, the brake due to transmission is utilized together with the ordinary brake systems.

Because the above-mentioned normal control is performed on condition that the control is out of the special control procedures, as explained formerly, the motorcycle is controlled to make best use of the engine power.

The above explanation has been based on a specific motorcycle structure and a specific procedure, but the invention is not restricted to the above-mentioned structure and procedure. For example, the motorcycle can be replaced by an automobile.

5. Effects of the Invention

As a result of the above-mentioned transmission ratio control procedure, transmission ratio is controlled at any prospective driving condition of the motorcycle so that the acceleration, braking and other handling of the motorcycle follows the operation of the driver as quickly as possible. The motorcycle equipped with the automatic transmission becomes fuel saving also because the transmission ratio is set low when running at a constant speed is desired. Operation of the motorcycle becomes simple also because the driver is not required to adjust both the change lever and the clutch lever. The driving wheel is kept to keep a grip of the ground as much as possible by virtue of the present transmission ratio control method.

The method according to the invention secures a possibility of starting the engine by shoving the vehicle, which operation is needed especially when an automatic transmission is used in a motorcycle. The engine is re-started without any further operation when the engine stops while the vehicle is running at a relatively low speed.

The method provides a possibility of adjusting the transmission ratio by an operation of the driver although the transmission ratio is mainly controlled automatically.

A prompt acceleration making maximum use of the engine power is obtained by means of the present method because the method assures to keep the transmission at a high ratio until the speed of the vehicle comes to a prescribed level.

As a transmission ratio is re-adjusted while the vehicle is jumping, the driving wheel recovers a grip of the ground as quickly as possible without exerting an unnecessary braking force or sudden acceleration when the vehicle comes down to the ground. The engine is protected from over speeding which might be caused in the case that the transmission ratio is set at a high value.

While the driving wheel is spinning, due to an excessive driving force, as the vehicle is being accelerated, the transmission ratio is kept constant in order to secure a quick recovery of a grip of the ground. When the driving wheel is locked due to an excessive braking force while the vehicle is slowing down, the transmission ratio is set at a high ratio in order to assure a quick acceleration after the slip.

The driver may clutch-on and off while the vehicle is running under an inertial force thereof, so as to avoid an unnecessary engine brake, etc. In such a case, the transmission ratio is re-adjusted while the clutch is off so that the rotational speed of the driving wheel coincides with the actual speed of the vehicle when the clutch is set on again.

The transmission is used to exert a braking force to the driving wheel by an operation of the hydraulic distributor mechanism. Thus a brake mechanism is provided together with an ordinary brake mechanism. The brake mechanism can be used as a parking brake, also.

What is claimed is:

1. A method for controlling an automatic transmission for a vehicle with an engine, said automatic transmission being capable of continuously varying a transmission ratio and a transmission coefficient, said method comprising the steps of:
   (a) automatically selecting and setting said transmission ratio according to an initial stage control procedure when a speed of said vehicle is lower than a prescribed value;
   (b) automatically selecting and setting said transmission ratio according to a special stage control procedure in a condition that said vehicle is out of said initial stage control procedure and a transmission for transmitting a driving force from an engine to the ground is disconnected at least at one part; and
   (c) automatically selecting and setting said transmission ratio according to a normal stage control procedure in a condition that said vehicle is out of both said initial stage control and said special stage control.

2. A method for controlling an automatic transmission according to claim 1, wherein said initial stage control procedure comprises the steps of:
   (a-1) gathering data from sensors disposed within said vehicle, said data representing conditions of said vehicle;
   (a-2) subsequently, judging whether or not said sensors and said vehicle are in normal order, and proceeding to step (a-3) when the judgment is negative and proceeding to a next step when the judgment is positive;
   (a-3) setting said transmission coefficient to zero and returning to step (a-1).

3. A method for controlling an automatic transmission according to claim 1, wherein said initial stage control procedure comprises the steps of:
   (a-1) gathering data from sensors disposed within said vehicle, said data representing conditions of said vehicle;
   (a-4) subsequently, judging whether or not a rotational speed of said engine is higher than a prescribed value, and proceeding to a step (a-5) when the judgment is negative and proceeding to a next step when the judgment is positive; and
   (a-5) setting said transmission ratio between a higher reference and a lower reference ratio and returning to a step (a-1).

4. A method for controlling an automatic transmission according to claim 1, wherein said initial stage control procedure comprises the steps of:
   (a-1) gathering data from sensors disposed within "said vehicle", said data representing conditions of "said vehicle;"
   (a-6) subsequently, judging whether or not a speed of said vehicle is higher than a prescribed value, and preceeding to a step (a-7) when the judgment is negative and proceeding to a next step when the judgement is positive; and
   (a-7) setting said transmission ratio at a high level and returning to step (a-1).

5. A method for controlling an automatic transmission according to claim 1, wherein said initial stage control procedure comprises the steps of:
   (a-1) gathering data from sensors disposed within said vehicle, said data representing conditions of said vehicle;
   (a-2) subsequently, judging whether or not both of said sensors and said vehicle are in normal order, and proceeding to step (a-4) when the judgement is positive and proceeding to step (a-3) when the judgement is negative;
   (a-3) setting said transmission coefficient to zero and returning to step (a-1);
   (a-4) judging whether or not a rotational speed of said engine is higher than a prescribed value, and proceeding to step (a-6) when the judgement is positive and proceeding to step (a-5) when the judgement is negative;
   (a-5) setting said transmission ratio between a higher reference ratio and a lower reference ratio and returning to step (a-1);
   (a-6) judging whether or nor a speed of said vehicle is higher than a prescribed value, and proceeding to said special stage control procedure when the judgement is positive and proceeding to step (a-7) when the judgement is negative;
   (a-7) setting said transmission ratio at a high level and returning to step (a-1).

6. A method for controlling an automatic transmission according to claim 5, which further comprises the steps of:

(a-8) judging whether or not a signal is being emitted indicating a manual control order; and (a-9) controlling the transmission ratio according to the signal when said manual control order is being emitted.

7. A method for controlling an automatic transmission according to claim 1, wherein said special stage control procedure comprises the steps of:

(b-1) judging whether or not a driving wheel grips the ground and proceeding to step (b-2) when the judgement is negative and proceeding to a next step when the judgement is positive; and a (b-2) setting said transmission ratio according to a ratio at a last moment wherein said judgement has been positive and length of time interval wherein the judgement has been negative, and returning to said initial stage control procedure.

8. A method for controlling an automatic transmission according to claim 1, wherein said special stage control procedure comprises the steps of:

(b-3) judging whether or not an increment of a rotational speed of said driving wheel in a predetermined time interval is within a prescribed value, and proceeding to step (b-4) when the judgement is negative and proceeding to a next step when the judgement is positive; and (b-4) setting said transmission ratio according to a transmission ratio at a last moment wherein the judgement has been positive and returning to said initial stage control procedure.

9. A method of controlling an automatic transmission according to claim 1, wherein said special stage control procedure comprises the steps of:

(b-3) judging whether or not an increment of a rotational speed of a driving wheel in a predetermined time interval is within a prescribed value, and proceeding to step (b-41) when the judgment is negative and proceeding to a next step with the judgment is positive; and (b-41) keeping said transmission ratio unchanged and returning to said initial control procedure.

10. A method for controlling an automatic transmission according to claim 1, wherein said special stage control procedure comprises the steps of:

(b-5) judging whether or not said transmission coefficient is set to be higher than a reference value, and proceeding to step (b-6) when the judgement is negative and proceeding to next step when the judgement is positive; and (b-6) setting said transmission ratio according to a time interval wherein said transmission coefficient is lower than said highest value, and a time increment of speed of said vehicle, and returning to said initial stage control procedure.

11. A method for controlling an automatic transmission according to claim 1, wherein said special stage control procedure comprises the steps of:

(b-1) judging whether or not a driving wheel grips the ground and proceeding to step (b-2) when the judgement is negative and proceeding to step (b-3) when the judgement is positive;

(b-2) setting said transmission ratio according to a ratio at a last moment wherein said judgement has been positive, and a length of time interval wherein the judgement has been negative, and returning to said initial stage control procedure;

(b-3) judging whether or not an increment of a rotational speed of said driving wheel in a predetermined time interval is within a prescribed value, and proceeding to step (b-4) when the judgement is negative and proceeding to step (b-5) when the judgement is positive;

(b-4) setting said transmission ratio according to a transmission ratio at a last moment wherein the judgement has been positive and returning to said initial stage control procedure;

(b-5) judging whether or not said transmission coefficient is set to be higher than a reference value, and proceeding to step (b-6) when the judgement is negative and proceeding to said normal stage control procedure when the judgement is positive; and (b-6) setting said transmission ratio according to a time interval wherein said transmission coefficient is lower than said highest value, and a time increment of speed of said vehicle, and returning to said initial stage control procedure.

12. A method for controlling an automatic transmission according to claim 1, wherein said normal stage control procedure control said transmission ratio according to a throttle aperture (AT), rotational speed of said engine (Ne) and speed of said vehicle (V).

13. A method for controlling an automatic transmission for a vehicle with an engine, said automatic transmission being capable of continuously varying a transmission ratio and a transmission coefficient between a highest and a lowest level, said method comprising the steps of:

(a-1) gathering data from sensors disposed within said vehicle, said data representing conditions of said vehicle;

(a-2) subsequently, judging whether or not said sensors and said vehicle are in normal order, and proceeding to step (a-4) when the judgement is positive and proceeding to step (a-3) when the judgement is negative;

(a-3) setting said transmission coefficient to zero and returning to step (a-1);

(a-4) judging whether or not a rotational speed of said engine is higher than a prescribed value, and proceeding to step (a-6) when the judgement is positive and proceeding to step (a-5) when the judgement is negative;

(a-5) setting said transmission ratio between a higher reference ratio and a lower reference ratio and returning to step (a-1);

(a-6) judging whether or not a speed of said vehicle is higher than a prescribed value, and proceeding to step (b-1) when the judgement is positive and proceeding to step (a-7) when the judgement is negative;

(a-7) setting said transmission ratio at a high level and returning to step (a-1);

(b-1) judging whether or not a driving wheel grips the ground and proceeding to step (b-2) when the judgement is negative and proceeding to step (b-3) when the judgement is positive;

(b-2) setting said transmission ratio according to a ratio at a last moment wherein said judgement has been positive, and a length of time interval wherein the judgement has been negative, and returning to said initial stage control procedure;

(b-3) judging whether or not an increment of a rotational speed of said driving wheel in a predetermined time interval is within a prescribed value, and proceeding to step (b-4) when the judgement is negative and proceeding to step (b-5) when the judgement is positive;

(b-4) setting said transmission ratio according to a transmission ratio at a last moment wherein the judgement has been positive and returning to step (a-1);

(b-5) judging whether or not said transmission coefficient is set to be higher than a reference value and, proceeding to step (b-6) when the judgement is negative and proceeding to step (c-1) when the judgement is positive;

(b-6) setting said transmission ratio according to a time interval wherein said transmission coefficient is lower than said highest value, and a time increment of speed of said vehicle, and returning to step (a-1); and (c-1) controlling said transmission ratio according to throttle aperture (AT), rotational speed of said engine (Ne) and speed of said vehicle (V).

14. A method for automatically controlling an automatic transmission according to claims 2, 3, 4, 5 or 13, wherein said sensors comprise an engine sensor (Se) for sensing a rotational speed of said engine, a throttle sensor (St) for sensing an aperture of a throttle, a ratio sensor (Sr) for sensing a transmission ratio of said automatic transmission, and a speed sensor (Ss) for sensing a speed of said vehicle.

15. A method for controlling an automatic transmission according to claims 3, 5 or 13, wherein said prescribed value referred to in step (a-4) is determined so as to be lower than an idling rotational speed of "said engine".

16. A method for controlling an automatic transmission according to claims 3, 5 or 13, wherein said step (a-5) comprises the steps of:

(a-51) judging whether or not said transmission ratio is lower than said lower reference ratio, and proceeding to step (a-52) when the judgement is positive and proceeding to step (a-53) when the judgement is negative;

(a-52) setting said transmission ratio to a prescribed value between said higher reference ratio and said lower reference ratio, and proceeding to step (a-55);

(a-53) judging whether or not said transmission ratio is higher than said higher reference ratio, and proceeding to step (a-54) when the judgement is positive and proceeding to step (a-55) when the judgement is negative;

(a-54) setting said transmission ratio to said prescribed value and proceeding to step (a-55); and (a-55) keeping said transmission ratio as it is and returning to step (a-1).

17. A method for controlling an automatic transmission according to claims 4, 5 or 13, wherein said step (a-7) comprises the steps of:

(a-71) setting said transmission ratio to a prescribed high ratio and proceeding to step (a-73); and (a-73) keeping said transmission ratio as it is and returning to step (a-1).

18. A method of controlling an automatic transmission according to claims 7, 11 or 13, wherein said step (b-2) comprises the steps of:

(b-21) judging whether or not said length of time interval exceeds a prescribed length, and proceeding to step (b-23) when the judgement is positive and proceeding to step (b-22) when the judgement is negative;

(b-23) calculating an objective transmission ratio as a function of said length of time interval and proceeding to step (b-24);

(b-22) keeping said transmission ratio as it is and returning to said initial stage control procedure;

(b-24) judging whether or not an actual transmission ratio coincides with said objective transmission ratio, and proceeding to step (b-25) when the judgement is positive and proceeding to step (b-26) when the judgment is negative;

(b-25) keeping said transmission ratio as it is and returning to said initial stage control procedure; and (b-26) setting said transmission ratio to said objective transmission ratio and returning to said initial stage control procedure.

19. A method of controlling an automatic transmission according to claims 8, 11 or 13, wherein said step (b-4) comprises steps of:

judging whether or not said increment of rotational speed is positive, and proceeding to step (b-401) when the judgement is negative and proceeding to step (b-404) when the judgement is positive;

(b-401) judging whether or not said increment of rotational speed is higher than a prescribed value, and returning to step (b-3) if the judgement is positive and proceeding to step (b-402) if the judgement is negative;

(b-402) judging whether or not said increment of rotational speed continues to not be higher than said prescribed value for longer than a prescribed period of time, and proceeding to step (b-403) when the judgement is negative and proceeding to (b-407) when the judgement is positive;

(b-403) setting said transmission ratio to a ratio of a last moment wherein said increment of rotational speed has been between a prescribed minimum difference value and a prescribed maximum difference value and returning to said initial stage control procedure;

(b-404) judging whether or not said increment of rotational speed is lower than a prescribed lowest increment, and returning to said step (b-3) when the judgement is positive and proceeding to step (b-405) when the judgement is negative;

(b-405) judging whether or not an absolute difference of a rotational speed of a non-driving wheel and that of a driving wheel is greater than a prescribed minimum difference value, and proceeding to step (b-410) when the judgement is positive and proceeding to step (b-406) when the judgement is negative;

(b-406) setting said transmission ratio to a ratio of a last moment wherein said increment of rotational speed has been between said prescribed minimum difference value and said prescribed maximum difference value and returning to said initial stage control procedure;

(b-407) calculating a speed of said vehicle on the basis of the rotational speed of the non-driving wheel and proceeding to step (b-408);

(b-408) calculating an objective transmission ratio according to the calculated speed of said vehicle and proceeding to step (b-409);

(b-409) setting said transmission ratio to said objective transmission ratio and returning to said initial stage control procedure;

(b-410) calculating an increment of rotational speed of a non-driving wheel in a predetermined time interval, judging whether or not an absolute value of the calculated increment is larger than a prescribed reference increment, and proceeding to step (b-411) when the judgement is negative and proceeding to step (b-414) when the judgement is positive;

(b-411) calculating an actual speed of the vehicle on the basis of the rotational speed of the non-driving wheel and proceeding to step 412;

(b-412) calculating an objective transmission ratio according to the calculated actual speed of said vehicle and proceeding to step (b-413);

(b-413) setting said transmission ratio to said objective transmission ratio and returning to said initial stage controlling procedure;

(b-414) estimating a speed of said vehicle according to a rotational speed of said non-driving wheel and proceeding to step (b-415);

(b-415) calculating an objective transmission ratio according to the estimation of a speed of said vehicle and proceeding to step (b-416);

(b-416) setting said transmission ratio to said objective transmission ratio and returning to said initial stage controlling procedure.

20. A method of controlling an automatic transmission according to claims 10, 11 or 13, wherein said step (b-6) comprises steps of:

(b-601) judging whether or not said transmission coefficient was higher than said reference value at a last moment, and proceeding to step (b-602) when the judgement is negative and proceeding to step (b-603) when the judgement is positive;

(b-602) reading current speed (VF) and transmission ratio (RF) of said vehicle, and proceeding to step (b-603);

(b-603) and (b-604) calculating a duration time (Td) wherein said transmission coefficient has been equal to or lower than said reference value;

(b-605) and (b-606) calculating a difference between said current speed and a speed VT at a last moment wherein said transmission coefficient was higher than a reference value, and proceeding to step (b-607);

(b-607) determining an objective transmission ratio Rm according to said difference, transmission ratio (RF) and duration time (Td), and proceeding to step (b-608);

(b-608) judging whether or not said current transmission ratio (Rf) coincides with said objective transmission ratio Rm, and proceeding to step (b-609) when the judgement is positive and proceeding to (b-610) when the judgement is negative;

(b-609) keeping said transmission ratio as it is and returning to said initial stage controlling procedure; and (b-610) setting said transmission ratio to said objective transmission ratio Rm and returning to said initial stage controlling procedure.

21. A method of controlling an automatic transmission according to claim 1, wherein said normal stage control procedure comprises steps of:

(c-11) estimating an objective rotational speed (Nem) of said engine as a function of said current rotational speed (Ne) of said engine, throttle aperture (AT), speed (V) of said vehicle and transmission ratio (R);

(c-12) judging whether or not said current rotational speed (Ne) is higher than said objective rotational speed (Nem), and proceeding to step (c-13);

(c-13) determining an objective transmission ratio by virtue of a prescribed map and proceeding to step (c-14); and (c-14) setting said transmission ratio to said objective transmission ratio and returning to said initial stage controlling procedure.

22. A method of controlling an automatic transmission according to claim 1, wherein said automatic transmission is an inclined plate type hydraulic transmission comprising:

(a) gear means for receiving rotational force of said engine;

(b) an inclined plate type hydraulic pump having an axis, connected to said gear means and having (i) an inclined rotational plate having an inclined surface inclined to said axis for rotational movement about said axis, (ii) oil cylinders extending parallel to said axis, and (iii) plungers being received by said cylinders for reciprocal movement therealong, said hydraulic pump pumping out oil therefrom;

(c) hydraulic distributor means for receiving and distributing said oil pumped out by said hydraulic pump;

(d) an inclined plate type hydraulic motor connected to said hydraulic distributor means for receiving said oil therefrom, said hydraulic motor having an inclined fixed plate inclined to said axis at an angle, rotational speed of said hydraulic motor being variable by changing the angle of said inclined fixed plate; and (e) rotational means for transmitting rotational movement of said hydraulic motor.

23. A method for controlling an automatic transmission according to claim 22, wherein said rotational speed of said hydraulic motor can be set to be zero by an operation of said hydraulic distributor means.

24. A method for controlling an automatic transmission according to claim 22 or 23, wherein said angle of said inclined fixed plate is adjustable by an electric motor means.

25. A method for controlling an automatic transmission according to claim 4, 5 or 12, wherein said speed of "said vehicle" is determined by a rotational speed of a non-driving wheel.

26. A method for controlling an automatic transmission according to claim 7, 11 or 13, wherein it is judged that "said driving wheel" grips the ground when a speed of said vehicle calculated by a rotational speed of said non-driving wheel falls within a prescribed error from a speed of said vehicle calculated by a rotational speed of said driving wheel.

27. A method for controlling an automatic, continuously variable transmission for a vehicle, comprising the steps of:

(a) sensing the speed of the vehicle;

(b) automatically selecting a first stage control procedure if the vehicle speed is below a prescribed value;

(c) controlling a transmission ratio between preselected values of said first stage control procedure;

(d) automatically selecting a second stage control procedure if the vehicle speed is above the preselected values; and (e) allowing the transmission ratio to exceed the preselected values when said second stage control procedure is selected.

28. A method for controlling an automatic, continuously variable transmission for a vehicle operated on a driving surface and having an engine, comprising the steps of:

(a) sensing the speed of the vehicle;

(b) sensing if the vehicle engine is substantially coupled with the driving surface;

(c) automatically selecting a special stage control procedure if the vehicle speed is above a preselected value and the vehicle engine is uncoupled from the driving surface; and when said special stage control procedure is selected, maintaining a transmission ratio existing prior to selection of said special stage control procedure.

* * * * *

UNITED STATES PATENT AND TRADEMARK OFFICE
CERTIFICATE OF CORRECTION

PATENT NO. : 4,984,161
DATED : January 8, 1991
INVENTOR(S) : Nakazawa et al.

It is certified that error appears in the above-identified patent and that said Letters Patent is hereby corrected as shown below:

In claim 4 (col. 36, l. 33) delete "preceeding" and insert therefor -- proceeding --.

In claim 9 (col. 37, l. 38) delete "with" and insert therefor -- when --.

In claim 10 (col. 37, l. 48) after "to" insert -- a --.

Signed and Sealed this

Twenty-ninth Day of December, 1992

Attest:

DOUGLAS B. COMER

*Attesting Officer*    Acting Commissioner of Patents and Trademarks